(12) United States Patent
Yuan et al.

(10) Patent No.: US 12,530,812 B2
(45) Date of Patent: Jan. 20, 2026

(54) POINT CLOUD ENCODING AND DECODING METHOD AND DECODER

(71) Applicant: GUANGDONG OPPO MOBILE TELECOMMUNICATIONS CORP., LTD., Guangdong (CN)

(72) Inventors: Hui Yuan, Guangdong (CN); Jinrui Xing, Guangdong (CN); Tingting Wang, Guangdong (CN); Ming Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 329 days.

(21) Appl. No.: 18/497,715

(22) Filed: Oct. 30, 2023

(65) Prior Publication Data
US 2024/0062427 A1 Feb. 22, 2024

Related U.S. Application Data

(63) Continuation of application No. PCT/CN2021/091960, filed on May 6, 2021.

(51) Int. Cl.
*G06T 9/00* (2006.01)
(52) U.S. Cl.
CPC .................... *G06T 9/001* (2013.01)
(58) Field of Classification Search
None
See application file for complete search history.

(56) References Cited

U.S. PATENT DOCUMENTS

| | | | | |
|---|---|---|---|---|
| 11,012,713 | B2* | 5/2021 | Kim | H04N 19/17 |
| 11,711,544 | B2* | 7/2023 | Tourapis | G06T 7/10 |
| | | | | 375/240.08 |
| 11,783,508 | B2* | 10/2023 | Mammou | G06T 7/11 |
| | | | | 382/232 |
| 12,198,389 | B2* | 1/2025 | Mammou | G06T 7/162 |

(Continued)

FOREIGN PATENT DOCUMENTS

| | | |
|---|---|---|
| CN | 106408604 | 2/2017 |
| CN | 110415342 | 11/2019 |

(Continued)

OTHER PUBLICATIONS

Kangying et al. (CN 111435551 A (Huawei Technologies Co., Ltd.) Jul. 21, 2020 (Jul. 21, 2020)). Provided by applicant. (Year: 2020).*

(Continued)

*Primary Examiner* — Anand P Bhatnagar
(74) *Attorney, Agent, or Firm* — Hodgson Russ LLP

(57) ABSTRACT

A point cloud encoding and decoding method and a decoder are provided. The decoder decodes a bitstream to determine filtering flag information corresponding to an initial point cloud, where the filtering flag information is used for determining whether to filter a reconstructed point cloud corresponding to the initial point cloud, determines a filtering coefficient when the filtering flag information indicates to filter the reconstructed point cloud, obtains a filtered point cloud corresponding to the reconstructed point cloud with the filtering coefficient, and updates the reconstructed point cloud with the filtered point cloud.

20 Claims, 10 Drawing Sheets

(56) References Cited

U.S. PATENT DOCUMENTS

| | | | |
|---|---|---|---|
| 12,401,822 B2* | 8/2025 | Kim | H04N 19/17 |
| 12,439,083 B2* | 10/2025 | Tourapis | H04N 19/467 |
| 2021/0099701 A1 | 4/2021 | Tourapis et al. | |
| 2023/0232004 A1* | 7/2023 | Yuan | H04N 19/157 |
| | | | 375/240.03 |
| 2023/0237704 A1* | 7/2023 | Yuan | H04N 19/117 |
| | | | 382/232 |
| 2023/0319310 A1* | 10/2023 | Tourapis | H04N 19/88 |
| | | | 375/240.08 |
| 2023/0342985 A1* | 10/2023 | Yuan | H04N 19/597 |
| 2025/0054197 A1* | 2/2025 | Tourapis | G06T 9/001 |

FOREIGN PATENT DOCUMENTS

| | | |
|---|---|---|
| CN | 110458772 | 11/2019 |
| CN | 111327906 | 6/2020 |
| CN | 111435551 | 7/2020 |
| CN | 111869208 | 10/2020 |
| WO | 2020146222 | 7/2020 |
| WO | 2020187283 | 9/2020 |

OTHER PUBLICATIONS

Vosoughi et al. ( WO 2020146222 AI (Tencent America L.L.C.) Jul. 16, 2020 (Jul. 16, 2020)). Provided by applicant. (Year: 2020).*
WIPO, International Search Report and Written Opinion for International Application No. PCT/CN2021/091960, Jan. 30, 2022.

* cited by examiner

ENCODING MODE OF LOSSLESS GEOMETRY AND LOSSY ATTRIBUTE (CY)

| Class | Sequence | End-to-End BD-AttrRate [%] | | | |
|---|---|---|---|---|---|
| | | Luma | Chroma Cb | Chroma Cr | Reflectance |
| | Cat1-A average | -0.3% | -12.7% | -14.7% | |
| | Cat1-B average | 0.1% | -4.5% | -6.7% | |
| | Cat3-fused average | #DIV/0! | #DIV/0! | #DIV/0! | #DIV/0! |
| | Cat3-frame average | | | | #DIV/0! |
| | Overall average | -0.2% | -9.5% | -11.6% | #DIV/0! |
| | Avg (geometric) time [%] | | | | |

ENCODING MODE OF LOSSLESS GEOMETRY AND LOSSLESS ATTRIBUTE (C1)
| Class | Sequence | End-to-End BD-AttrRate [%] | | | |
|---|---|---|---|---|---|
| | | Luma | Chroma Cb | Chroma Cr | Reflectance |
| | Cat1-A average | -1.7% | -36.3% | -45.3% | |
| | Cat1-B average | 0.3% | -33.9% | -42.0% | |
| | Cat3-fused average | #DIV/0! | #DIV/0! | #DIV/0! | #DIV/0! |
| | Cat3-frame average | | | | #DIV/0! |
| | Overall average | -0.9% | -35.4% | -44.0% | #DIV/0! |
| Overall | Total time [s] | | | | |
| | Total time [%] | | | | |
| | Avg (geometric) time [s] | | | | |
FIG. 12
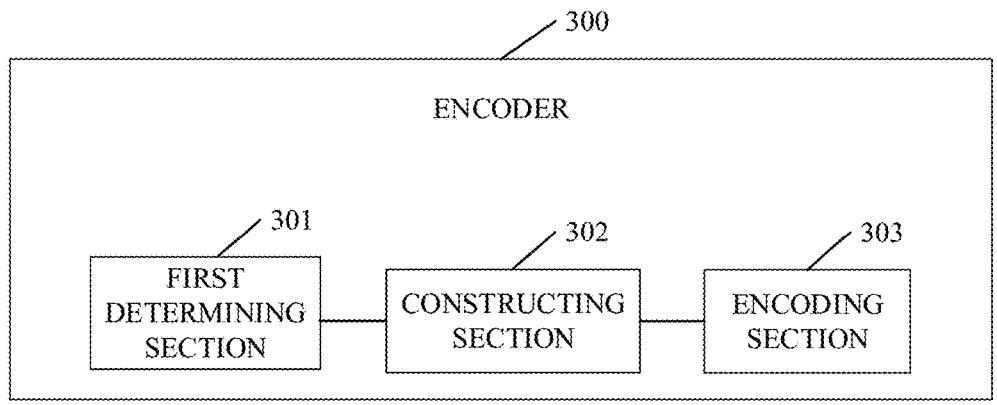
FIG. 13
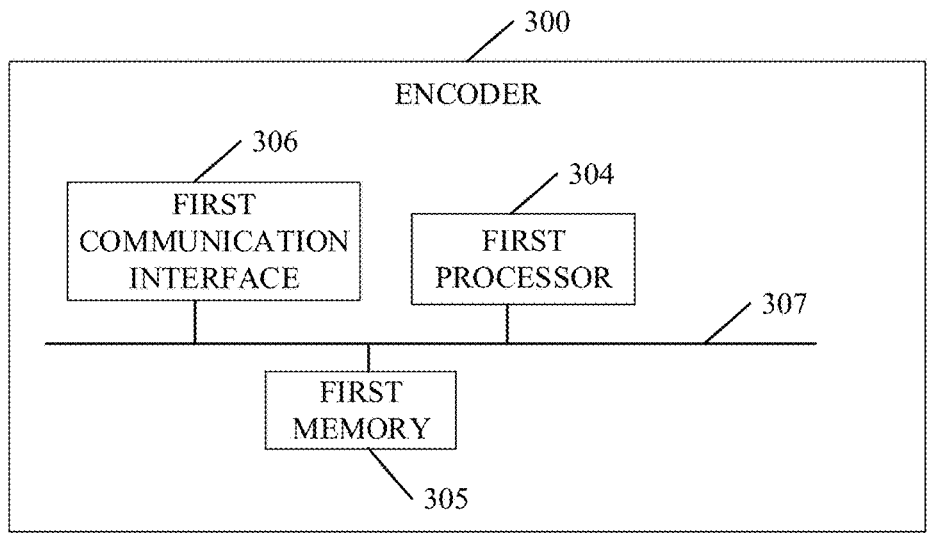
FIG. 14

POINT CLOUD ENCODING AND DECODING METHOD AND DECODER

CROSS-REFERENCE TO RELATED APPLICATION(S)

This application is a continuation of International Application No. PCT/CN2021/091960, filed May 6, 2021, the entire disclosure of which is hereby incorporated by reference.

TECHNICAL FIELD

Embodiments of the disclosure relates to the field of video encoding and decoding technology, in particular to a point cloud encoding and decoding method and a decoder.

BACKGROUND

At present, in an encoder framework of geometry-based point cloud compression (G-PCC), encoding of attribute information of a point cloud mainly aims at encoding of colour information. First, the colour information is transformed from an RGB colour space to a YUV colour space. Then, the point cloud is re-colored with reconstructed geometry information, so that attribute information that has not been encoded can correspond to the reconstructed geometry information. In encoding of the colour information, three colour attribute transform encoding modes: predicting transform, lifting transform, and region adaptive hierarchical transform (RAHT) are mainly used, and finally a binary bitstream is generated.

However, the common point cloud encoding and decoding method has low prediction accuracy, which causes large difference between a reconstructed point cloud and an original point cloud, affecting quality of the whole point cloud, thereby reducing encoding and decoding efficiency.

SUMMARY

In a first aspect, embodiments of the disclosure provide a point cloud decoding method. The point cloud decoding method is applied to a decoder and includes the following. A bitstream is decoded to determine filtering flag information corresponding to an initial point cloud, where the filtering flag information is used for determining whether to filter a reconstructed point cloud corresponding to the initial point cloud. A filtering coefficient is determined when the filtering flag information indicates to filter the reconstructed point cloud. A filtered point cloud corresponding to the reconstructed point cloud is obtained with the filtering coefficient. The reconstructed point cloud is updated with the filtered point cloud.

In a second aspect, embodiments of the disclosure provide a point cloud encoding method. The point cloud encoding method is applied to an encoder and includes the following. A reconstructed value of attribute information of a point in an initial point cloud is determined, and a reconstructed point cloud corresponding to the initial point cloud is constructed based on the reconstructed value. A filtering coefficient is determined according to the initial point cloud and the reconstructed point cloud. A filtered point cloud corresponding to the reconstructed point cloud is obtained with the filtering coefficient. Filtering flag information corresponding to the initial point cloud is determined according to the reconstructed point cloud and the filtered point cloud, where the filtering flag information is used for determining whether to filter the reconstructed point cloud. The filtering flag information and the filtering coefficient are signalled into a bitstream when the filtering flag information indicates to filter the reconstructed point cloud.

In a third aspect, embodiments of the disclosure provide a decoder. The decoder includes at least one processor and a memory. The memory is coupled to the at least one processor and stores at least one computer executable instruction thereon. When executed by the at least one processor, the at least one computer executable instruction causes the at least one processor to execute the method of the first aspect.

BRIEF DESCRIPTION OF THE DRAWINGS

FIG. 12 is a schematic diagram of test results under a C1 test condition.
FIG. 13 is a schematic structural diagram 1 of an encoder.
FIG. 14 is a schematic structural diagram 2 of an encoder.

DETAILED DESCRIPTION

For a more detailed understanding of features and technical contents of embodiments of the disclosure, the implementation of embodiments of the disclosure will be described in detail below in conjunction with accompanying drawings. The accompanying drawings are merely for reference and are not intended to limit embodiments of the disclosure.

In embodiments of the disclosure, in an encoder framework of geometry-based point cloud compression (G-PCC), after a point cloud input to a three-dimensional picture model is partitioned into slices, each slice is independently encoded.

Figure 1:
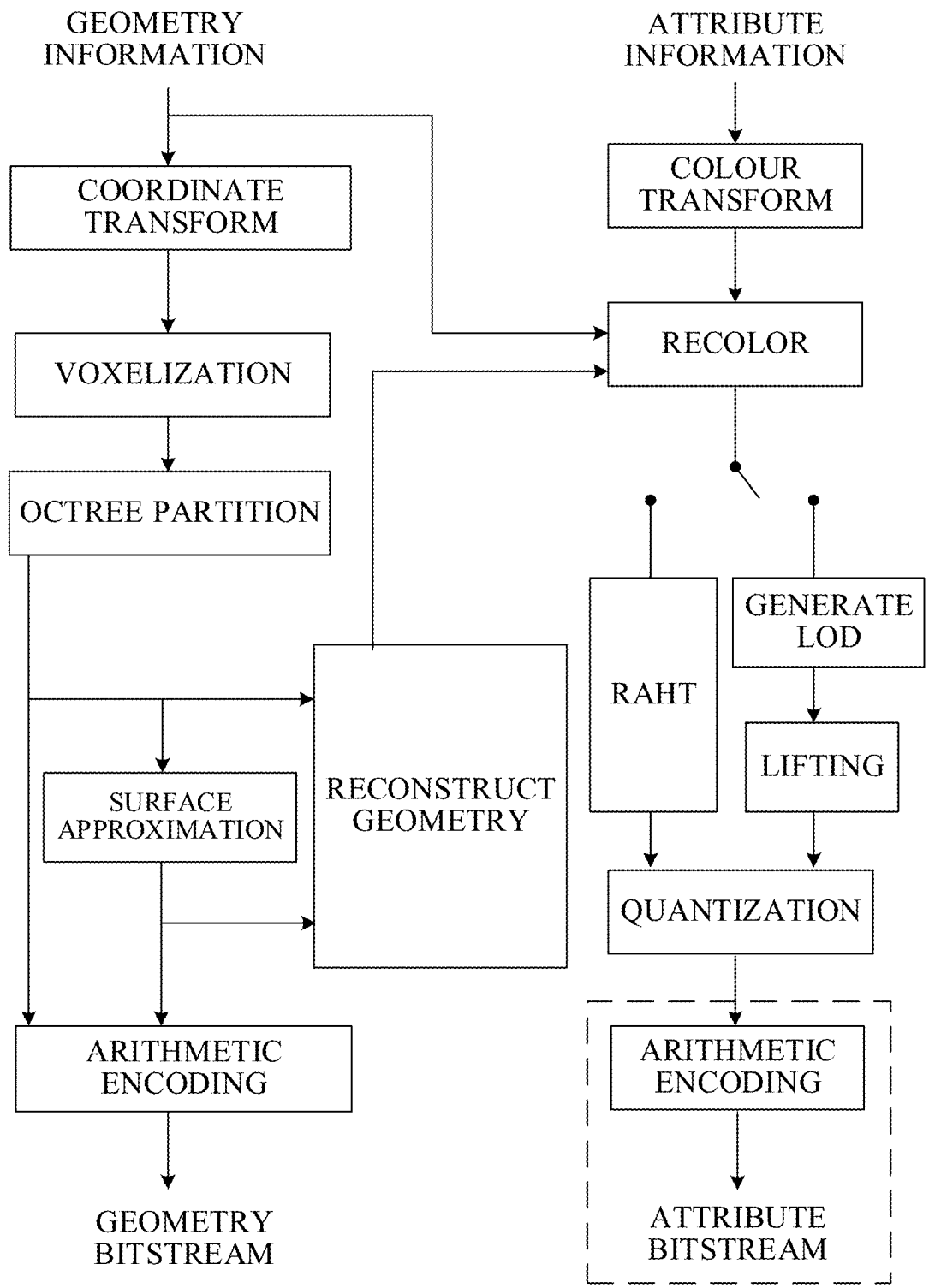
FIG. 1 is a block diagram of a process of geometry-based point cloud compression (G-PCC) encoding.

FIG. 1 is a block diagram of a process of G-PCC encoding. The block diagram of the process of G-PCC encoding illustrated in FIG. 1 is applied to a point cloud encoder. For point cloud data to-be-encoded, through slice partitioning, the point cloud data is first partitioned into multiple slices. In each slice, geometry information of the point cloud and attribute information corresponding to each point cloud are encoded separately. During encoding of the geometry information, perform coordinate transform on the geometry information to so that all of the point cloud is contained in a bounding box, and then quantify, which mainly plays a role of scaling. Due to the rounding of quantifying, the geometry information of part of the point cloud is the same, so decide whether to remove duplicate points based on parameters. The process of quantifying and removing the duplicate points is also called the voxelization. Thereafter, perform octree partitioning on the bounding box. During encoding of the geometry information based on octree, the bounding box is equally partitioned into eight sub-cubes, and non-empty (including points in the point cloud) sub-cubes are continued to be partitioned into eight equal parts until leaf nodes obtained through partitioning are 1×1×1 unit cubes. Perform arithmetic encoding on nodes in the leaf nodes to generate a binary geometry bitstream, that is, geometry code stream. During encoding of the geometry information based on triangle soup (trisoup), octree partitioning is also performed first. Different from the encoding of the geometry information based on octree, the trisoup does not need to partition the point cloud step by step into unit cubes each with an edge length (also known as side length) of 1×1×1, but partitions the point cloud into blocks each with an edge length of W and then stops the partitioning. Based on a surface formed by distribution of the point cloud in each block, at most twelve vertexes generated by both the surface and twelve edges of the block are obtained. Perform arithmetic encoding on the vertexes (surface approximation based on vertexes), to generate a binary geometry bitstream, that is, geometry code stream. The vertexes are also used in implementation of geometry reconstruction and reconstructed geometry information is used when the attribute information of the point cloud is encoded.

During encoding of the attribute information, after the encoding of the geometry information is completed and the geometry information is reconstructed, colour transform is performed, that is, colour information (i.e., the attribute information) is transformed from an RGB colour space to a YUV colour space. Thereafter, use the reconstructed geometry information to recolor the point cloud, so that attribute information that has not been encoded can correspond to the reconstructed geometry information. The attribute encoding mainly aims at the colour information. During the encoding of the colour information, there are mainly two transform methods. One is distance-based lifting transform which relies on level of detail (LOD) partitioning. The other is region adaptive hierarchical transform (RAHT) which is performed directly. Both methods transform the colour information from a spatial domain to a frequency domain, obtain high-frequency coefficients and low-frequency coefficients through transform, and finally quantize the coefficients (i.e., quantized coefficients). At last, after octree partitioning and surface approximation, geometry encoding data and quantized coefficient processing attribute encoding data are slice-synthesized, and the vertex coordinate of each block are encoded in turn (that is, arithmetic encoding), to generate a binary attribute bitstream, that is, attribute code stream.

Figure 2:
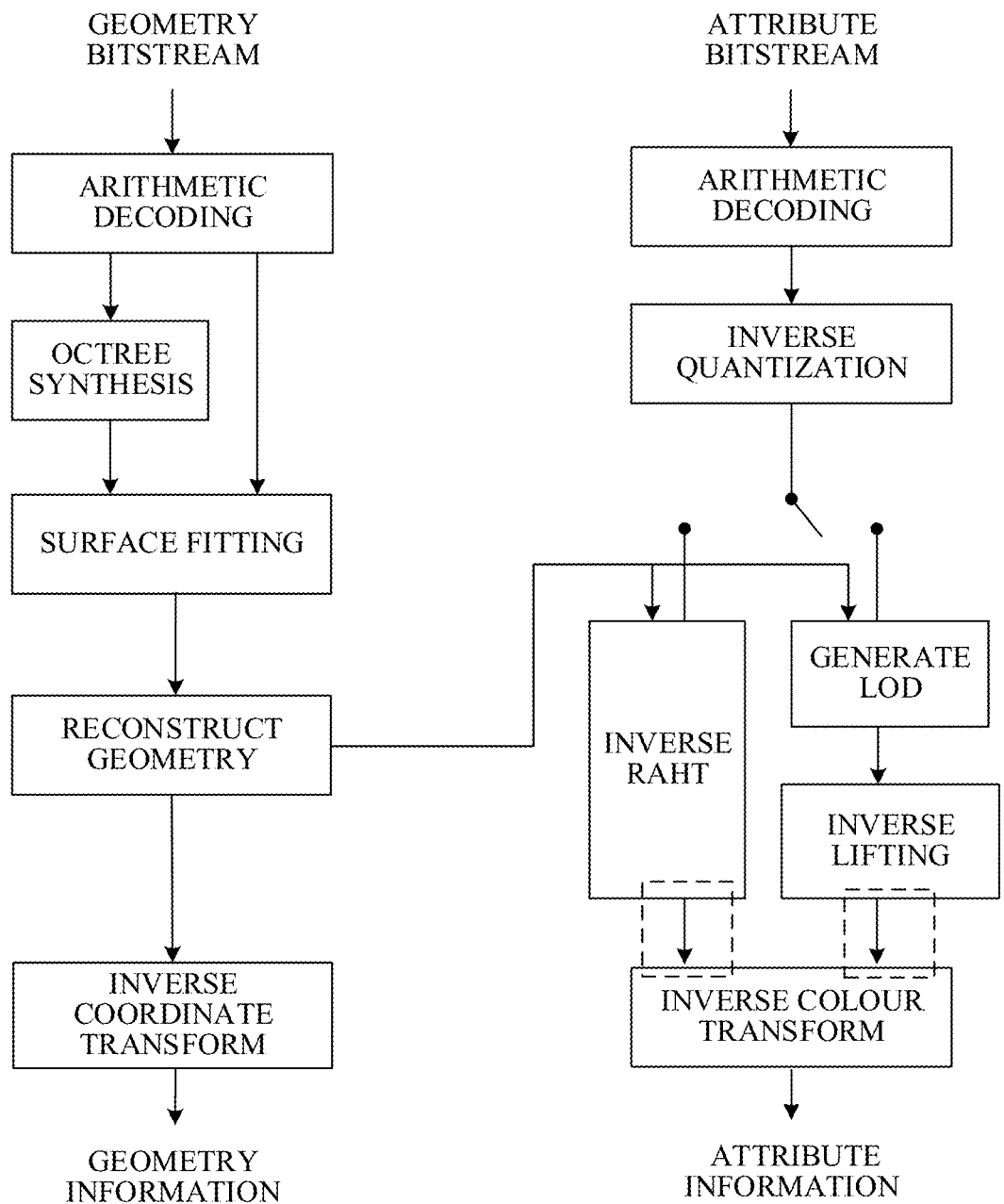
FIG. 2 is a block diagram of a process of G-PCC decoding.

FIG. 2 is a block diagram of a process of G-PCC decoding. The block diagram of the process of G-PCC decoding illustrated in FIG. 2 is applied to a point cloud decoder. The decoder obtains a binary bitstream and independently decodes the geometry bitstream and the attribute bitstream in the binary bitstream. When decoding the geometry bitstream, the geometry information of the point cloud is obtained through arithmetic decoding-octree synthesis-surface approximation-reconstructing geometry-inverse coordinate transform. When decoding the attribute bitstream, the attribute information of the point cloud is obtained through arithmetic decoding-inverse quantization-LOD-based inverse lifting or RAHT-based inverse transform-inverse colour transform. The three-dimensional image model of the point cloud data to-be-encoded is restored based on the geometry information and the attribute information.

In the block diagram of the process of G-PCC encoding illustrated in FIG. 1, LOD partition is mainly used for predicting transform and lifting transform in attribute transform of the point cloud.

The process of LOD partition is subsequent to the geometry reconstruction of the point cloud, and in this case, the geometry coordinate information of the point cloud can be obtained directly. According to Euclidean distances among points, the point cloud is partitioned into multiple LODs. The colour of points in each LOD is sequentially decoded, a value of the number of zeros (zero_cnt) in the zero run-length encoding technology is calculated, and then the residual is decoded.

Figure 3:
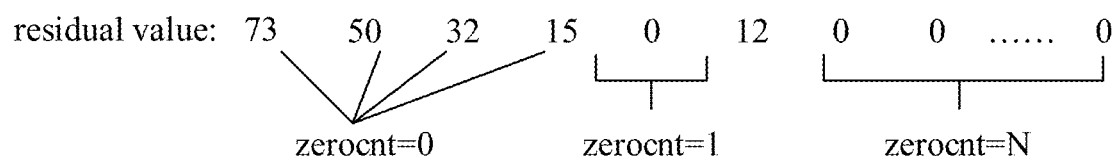
FIG. 3 is a schematic diagram of zero run-length encoding.

FIG. 3 is a schematic diagram of zero run-length encoding. As illustrated in FIG. 3, decoding is performed according to the zero run-length encoding method. First, a value of the 1st zero_cnt in the bitstream is parsed out. If it is greater than 0, zero_cnt--, indicating that the residual is equal to 0; and if zero_cnt is equal to 0, the attribute residual of this point is not equal to 0. Then, the corresponding residual value is decoded (decoder.decode (values)), and the decoded residual is inversely quantized and then added to the predictedColor of the current point, to obtain the reconstructed value of this point. The operation is continued until all the points in the point cloud are decoded.

That is, the reconstructed value of the colour of the current point is reconstructedColor, which needs to be calculated based on the prediction value (predictedColor) of the colour in the current prediction mode and the inverse-quantized residual value (residual) of the colour in the current prediction mode, that is, reconstructedColor=predictedColor+residual.

Furthermore, the current point will be used as the nearest neighbor of the subsequent point in the LOD, and the reconstructed value of the colour of the current point is used to predict the attribute of the subsequent point.

However, in the existing encoding and decoding framework, basic reconstruction of the point cloud sequence is performed, and after reconstruction, there is no certain processing to further improve the quality of the colour attribute of the reconstructed point cloud. As such, the difference between the reconstructed point cloud and the original point cloud may be large, and the distortion will be serious, which will affect the quality of the whole point cloud.

To solve the above problem, embodiments of the disclosure provide a point cloud encoding and decoding method. At the encoding end, the filtering coefficient for filtering is calculated with the initial point cloud and the reconstructed point cloud, and after the reconstructed point cloud is determined to be filtered, the filtering coefficient is transmitted to the decoding end. Accordingly, the decoding end can directly decode to obtain the filtering coefficient, and use the filtering coefficient to filter the reconstructed point cloud, which can optimize the reconstructed point cloud, improve the quality of the point cloud, and greatly improve the encoding and decoding efficiency.

It should be noted that, the point cloud encoding and decoding method provided in embodiments of the disclosure can affect the arithmetic encoding and subsequent parts in the point cloud encoding framework, and can also affect parts subsequent to attribute reconstruction in the decoding framework.

That is, the point cloud encoding method provided in embodiments of the disclosure can be applied to the arithmetic encoding and subsequent parts illustrated in FIG. 1. Accordingly, the point cloud decoding method provided in embodiments of the disclosure can be applied to the parts subsequent to attribute reconstruction illustrated in FIG. 2. That is, the point cloud encoding and decoding method in embodiments of the disclosure can be applied to a video encoding system, a video decoding system, or even both a video encoding system and a video decoding system, but embodiments of the disclosure is not limited.

The technical solution in embodiments of the disclosure will be clearly and completely described in the following with reference to the accompanying drawings in embodiments of the disclosure.

Figure 4:
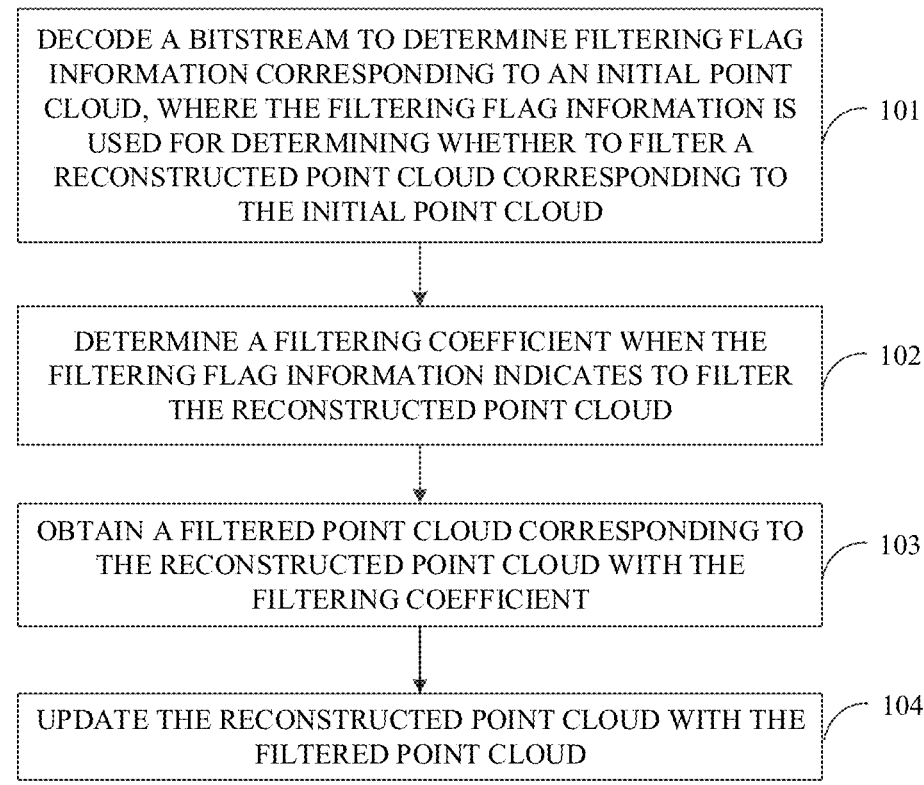
FIG. 4 is schematic flow chart 1 of point cloud decoding.

Embodiments of the disclosure provide a point cloud decoding method. The point cloud decoding method is applied to a point cloud decoder. FIG. 4 is schematic flow chart 1 of point cloud decoding. As illustrated in FIG. 4, in embodiments of the disclosure, the point cloud decoding method performed by the decoder includes the following.

At block 101, a bitstream is decoded to determine filtering flag information corresponding to an initial point cloud, where the filtering flag information is used for determining whether to filter a reconstructed point cloud corresponding to the initial point cloud.

In embodiments of the disclosure, the decoder may first decode the bitstream to determine the filtering flag information corresponding to the initial point cloud.

It should be noted that, in embodiments of the disclosure, the filtering flag information can be used to determine whether to filter the reconstructed point cloud corresponding to the initial point cloud. The filtering flag information may also be used to determine which colour component in the reconstructed point cloud is to be filtered.

It should be noted that, in embodiments of the disclosure, for a point in the initial point cloud, when decoding the point, the point can be used as a point to-be-decoded in the initial point cloud and there are multiple decoded points around the point.

Further, in embodiments of the disclosure, a point in the initial point cloud has one geometry information and one attribute information, where the geometry information represents the spatial position of the point and the attribute information represents the reconstructed attribute value of the point.

It should be noted that in embodiments of the disclosure, the attribute information may include colour information. The attribute information may be colour information in any colour space, for example, the attribute information may be colour information in an RGB space, colour information in a YUV space, or colour information in a YCbCr space, which is not limited in the disclosure.

Further, in embodiments of the disclosure, if the attribute information is the colour information in the RGB space, the colour component includes an R component, a G component, and a B component. If the attribute information is the colour information in the YUV space, the colour component includes a Y component, a U component, and a V component. If the attribute information is the colour information in the YCbCr space, the colour component includes a Y component, a Cb component, and a Cr component.

It can be understood that in embodiments of the disclosure, for a point in the initial point cloud, the attribute information of the point may be a decoded reconstructed attribute value, where the attribute information may be colour information, or may be reflectivity or other attributes, which is not limited in the disclosure.

It should be noted that in embodiments of the disclosure, the decoder decodes the bitstream to further determine the residual value of the attribute information of the point(s) in the initial point cloud.

Further, in embodiments of the disclosure, for a point in the initial point cloud, the residual value and the prediction value corresponding to the attribute information of the point can be determined, and then the reconstructed value of the attribute information of the point can be calculated with the residual value and the prediction value.

In embodiments of the disclosure, for a point in the initial point cloud, when determining the prediction value corresponding to the attribute information of the point, the geometry information and attribute information of multiple target neighbor points of the point as well as the geometry information of the point can be used to predict the attribute information of the current point, to obtain the corresponding prediction value.

It will be understood that, in embodiments of the disclosure, for a point in the initial point cloud, after the reconstructed value of the attribute information of the point is determined, the point can be used as the nearest neighbor of the subsequent point in the LOD, to continue the attribute prediction of the subsequent point with the reconstructed value of the attribute information of the point.

Further, in embodiments of the disclosure, after the reconstructed values of the attribute information of the points in the initial point cloud are determined, the corresponding reconstructed point cloud can be determined with the reconstructed value of the attribute information of each point in the initial point cloud.

It should be noted that in the disclosure, the initial point cloud can be obtained directly by the coding program: the point cloud reading function, and the reconstructed point cloud corresponding to the initial point cloud is obtained after attribute decoding, attribute reconstruction, and geometry offset.

That is, in embodiments of the disclosure, the reconstructed value of the attribute information of the point in the initial point cloud can be determined, and then the reconstructed point cloud corresponding to the initial point cloud can be constructed based on the reconstructed value. The residual value of the attribute information of the point in the initial point cloud can be determined by decoding the bitstream, and then the reconstructed value of the attribute information can be determined with the residual value and the prediction value of the point, and the reconstructed point cloud corresponding to the initial point cloud can be further constructed.

It should be noted that in embodiments of the disclosure, the filtering flag information may include identification information of the colour component, where the identification information of one colour component may be used to indicate whether to filter the one colour component.

It can be seen that, because the filtering flag information is determined based on the identification information corresponding to each colour component, the filtering flag information can be used not only to determine whether or not to filter the reconstructed point cloud, but also to determine which colour component is to be filtered.

In the disclosure, if a value of the identification information is a first value, indicate not to filter the colour component. If the value of the identification information is a second value, indicate to filter the colour component.

Further, in the disclosure, if all identification information of colour components is the first value, that is, indicating that each colour component is not filtered, determine that the filtering flag information indicates not to filter the reconstructed point cloud. Accordingly, if not all identification information of colour components is the first value, that is, indicating that at least one colour component is filtered, determine that the filtering flag information indicates to filter the reconstructed point cloud.

Exemplarily, in the disclosure, the first value is equal to 0 and the second value is equal to 1. Alternatively, the first value is set to "false" and the second value is set to "true".

At block 102, a filtering coefficient is determined when the filtering flag information indicates to filter the reconstructed point cloud.

In embodiments of the disclosure, after decoding the bitstream to determine the filtering flag information corresponding to the initial point cloud, if the filtering flag information indicates to filter the reconstructed point cloud, the decoder may further determine the filtering coefficient for filtering corresponding to the initial point cloud.

It should be noted that in embodiments of the disclosure, the filtering coefficient may be used for Wiener filtering, i.e., the filtering coefficient is the coefficient of Wiener filter. The filtering coefficient is the optimal filtering coefficient for filtering.

Wiener filter is a linear filter with the least square as the optimal criterion. Under certain constraints, the square of the difference between its output and a given function (generally called expected output) is minimized, which can eventually become a problem of solving Toeplitz equation through mathematical operation. Wiener filter is also called least square filter.

It will be appreciated that in embodiments of the disclosure, when determining the filtering coefficient, the decoder may decode the bitstream to obtain the filtering coefficient.

Further, in embodiments of the disclosure, after the decoder decodes the bitstream to determine the filtering flag information corresponding to the initial point cloud, if the filtering flag information indicates not to filter the reconstructed point cloud, the decoder does not need to determine the filtering coefficient.

At block 103, a filtered point cloud corresponding to the reconstructed point cloud is obtained with the filtering coefficient.

In embodiments of the disclosure, if the filtering flag information indicates to filter the reconstructed point cloud, after the filtering coefficient corresponding to the initial point cloud is determined, the reconstructed point cloud can be filtered with the filtering coefficient, to obtain the filtered point cloud corresponding to the reconstructed point cloud.

It should be noted that, in embodiments of the disclosure, each colour component of the point cloud can be filtered separately. For example, for the colour information in the YUV space, the filtering coefficient vector of the Y component, the filtering coefficient vector of the U component, and the filtering coefficient vector of the V component can be determined respectively. The filtering coefficient vectors together constitute the filtering coefficient of point cloud.

Further, in embodiments of the disclosure, when filtering the reconstructed point cloud with the filtering coefficient, a second attribute parameter corresponding to the colour component can be determined according to a reconstructed component value of the colour component of the colour information of a point in the reconstructed point cloud and a filter type. Then, a filtered value of attribute information corresponding to the colour component can be determined according to the filtering coefficient vector corresponding to the colour component and the second attribute parameter. Finally, the filtered point cloud can be constructed based on the filtered value of the attribute information of the colour component.

In the disclosure, if the attribute information is colour information in any space, for example, the attribute information is colour information in the YUV space, the first attribute parameter and the second attribute parameter of the colour component can be determined based on the initial component value and the reconstructed component value of the colour component (such as Y component, U component, V component) as well as the filter type.

It should be noted that in embodiments of the disclosure, the first attribute parameter is used for determining the attribute value of the colour component of the point in the initial point cloud. The second attribute parameter is used for determining the attribute value of the colour component of the point in the reconstructed point cloud. The first attribute parameter represents the colour attribute value of the point in the initial point cloud under one colour component. The second attribute parameter represents the colour attribute values of the point in the reconstructed point cloud and its k neighboring points under one colour component.

Further, in embodiments of the disclosure, the filter type may be used to indicate a filter order and/or a filter shape and/or a filter dimension. The filter shape includes diamond, rectangle, and the like. The filter dimension includes one-dimensional and multi-dimensional.

That is, in the disclosure, different filter types may correspond to filters with different orders, for example, filters with orders k of 16, 32, 128. Different filter types can also correspond to filters with different dimensions, for example, one-dimensional filter, two-dimensional filter and multi-dimensional filter. In the case of two-dimensional and multi-dimensional filters, different filter types may also indicate different filter shapes employed. For example, diamond filter, rectangular filter, etc.

It should be noted that, in the disclosure, the second attribute parameter corresponding to one colour component is calculated, and then the filtered value of the attribute information corresponding to the colour component is determined with the second attribute parameter and the filtering coefficient vector corresponding to the colour component. After all the colour components are traversed and the filtered value of the attribute information of each colour component is obtained, the filtered point cloud can be finally determined based on the filtered value of the attribute information of each colour component.

It can be understood that in embodiments of the disclosure, when filtering the reconstructed point cloud with the filter, both the reconstructed point cloud and the filtering coefficient can be input into the filter, that is, the input of the filter is the filtering coefficient and the reconstructed point cloud. Finally, the filtering of the reconstructed point cloud can be completed based on the filtering coefficient to obtain the corresponding filtered point cloud.

It should be noted that in the disclosure, the filtering parameter is obtained based on the original point cloud and the reconstructed point cloud, so the original point cloud can be restored to the maximum extent by applying the filtering coefficient to the reconstructed point cloud.

In the disclosure, when filtering the reconstructed point cloud according to the filtering coefficient, for one colour component of the colour information, the filtered value of the attribute information corresponding to the colour component can be determined based on the filtering coefficient vector corresponding to the colour component of the filtering coefficient and the second attribute parameter corresponding to the colour component.

Exemplarily, in the disclosure, the colour information in the YUV space in the point cloud sequence is illustrated as an example, and the filter order indicated by the filter type is assumed to be k. Assuming that the point cloud sequence is n, a matrix P(n, k) is used to represent the colour attribute values of the point in the reconstructed point cloud and its k neighboring points under the same colour component (e.g., Y component), i.e., P(n, k) is the second attribute parameter determined by the reconstructed component value of the Y component of the colour information of the point in the reconstructed point cloud and the filter type.

For example, in the disclosure, based on the following formula (13), the filtering coefficient vector H(k) under the Y component is applied to the corresponding second attribute parameter P(n, k), to obtain the filtered value R(n) of the attribute information under the Y component.

Then, the U component and the V component can be traversed according to the above method, and finally the filtered value of the attribute information under the U component and the filtered value of the attribute information under the V component can be determined. The filtered point cloud corresponding to the reconstructed point cloud can be constructed with the filtered value of the attribute information under each colour component.

At block 104, the reconstructed point cloud is updated with the filtered point cloud.

In embodiments of the disclosure, the decoder may further update the reconstructed point cloud using the filtered point cloud, after obtaining the filtered point cloud corresponding to the reconstructed point cloud with the filtering coefficient.

It should be noted that, in embodiments of the disclosure, compared with the reconstructed point cloud, the quality of the filtered point cloud obtained after filtering is greatly enhanced. Thus, after obtaining the filtered point cloud, the previous reconstructed point cloud can be updated with the filtered point cloud. The filtered point cloud can be used to cover the previous reconstructed point cloud, to achieve the whole encoding and decoding and quality enhancement operations.

Figure 5:
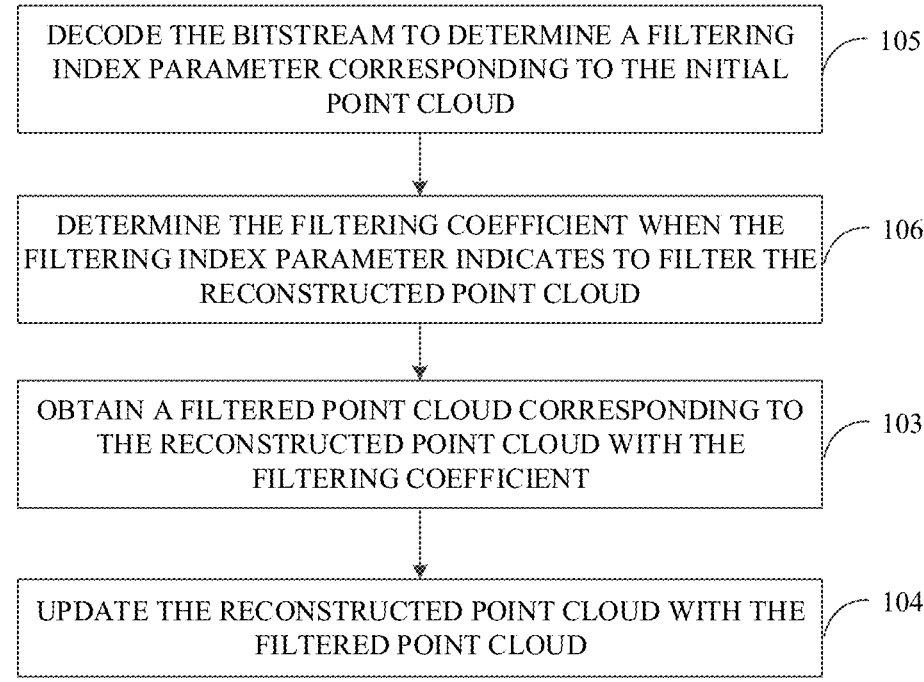
FIG. 5 is schematic flow chart 2 of point cloud decoding.

Further, in embodiments of the disclosure, FIG. 5 is schematic flow chart 2 of point cloud decoding. As illustrated in FIG. 5, before the filtered point cloud corresponding to the reconstructed point cloud is obtained with the filtering coefficient, that is, before the operation at 103, the point cloud decoding method performed by the decoder may further include the following.

At block 105, the bitstream is decoded to determine a filtering index parameter corresponding to the initial point cloud.

At block 106, the filtering coefficient is determined when the filtering index parameter indicates to filter the reconstructed point cloud.

In embodiments of the disclosure, the decoder can also decode the bitstream to determine the filtering index parameter corresponding to the initial point cloud. If the filtering index parameter indicates to filter the reconstructed point cloud, the decoder may further decode to obtain corresponding filtering coefficient.

It should be noted that in embodiments of the disclosure, the filtering index parameter may be used to determine whether to filter the reconstructed point cloud. The filtering flag information may also be used to determine the filter to be used for filtering.

Exemplarily, in embodiments of the disclosure, if the value of the filtering index parameter is equal to 0, determine not to filter the reconstructed point cloud; if the value of the filtering index parameter is not equal to 0 (for example, 1, 2, 3, etc.), determine to filter the reconstructed point cloud.

Further, in embodiments of the disclosure, when determining the filter by using the filtering index parameter, if the value of the filtering index parameter is equal to 1, determine to filter the reconstructed point cloud with a one-dimensional filter. If the value of the filtering index parameter is equal to 2, determine to filter the reconstructed point cloud with a two-dimensional filter, where the two-dimensional filter is any one of diamond filter and rectangular filter. Alternatively, if the value of the filtering index parameter is equal to 2, determine to filter the reconstructed point cloud with a multi-dimensional filter. That is, the value of the filtering index parameter being equal to 0 means that the reconstructed point cloud is not filtered, and when the value of the filtering index parameter is not equal to 0, different values mean different filters used to filter the reconstructed point cloud.

Thus, in embodiments of the disclosure, it is possible to determine whether or not to filter the reconstructed point cloud with "flag" (e.g., filtering flag information) or "index" (e.g., filtering index parameter). That is, the specific form of determining whether or not to perform filtering is not limited in the disclosure.

Further, in embodiments of the disclosure, after decoding the bitstream to obtain the filtering flag information corresponding to the initial point cloud, if the filtering flag information indicates not to filter the reconstructed point cloud, the filtering coefficient may not be determined, that is, the filtering coefficient is no longer decoded. Alternatively, after obtaining the filtering index parameter corresponding to the initial point cloud by decoding the bitstream, if the value of the filtering index parameter indicates not to filter the reconstructed point cloud, the filtering coefficient may not be determined, that is, the filtering coefficient is no longer decoded.

It can be understood that in the disclosure, if the filtering flag information indicates not to filter the reconstructed point cloud, or if the value of the filtering index parameter indicates not to filter the reconstructed point cloud, the decoder can skip the filtering and perform the point cloud reconstruction according to the original program, that is, the reconstructed point cloud is not updated.

Further, in embodiments of the disclosure, when determining whether to filter the reconstructed point cloud, the quantization parameter may also be introduced, that is, whether to perform filtering may be further determined with the quantization parameter as well as the filtering flag information and/or the filtering index parameter.

In the disclosure, the quantization parameter of the initial point cloud can be determined. Then, whether to filter the reconstructed point cloud is determined according to the quantization parameter, the filtering flag information, and/or the filtering index parameter. The quantization parameter can characterize quantization step size.

It can be understood that in the disclosure, when determining whether to perform filtering on the reconstructed point cloud according to the quantization parameter, the filtering flag information, and/or the filtering index parameter, whether to perform filtering can be determined based on the quantization parameter, the filtering flag information, and/or the filtering index parameter, respectively. When the quantization parameter, the filtering flag information, and the filtering index parameter all indicate to perform filtering, it can be determined to perform filtering on the reconstructed point cloud, and signal the filtering parameter into the bitstream. Alternatively, when at least one of the quantization parameter, the filtering flag information, or the filtering index parameter indicates to perform filtering, it can be determined to perform filtering on the reconstructed point cloud, and signal the filtering parameter into the bitstream.

Alternatively, in embodiments of the disclosure, the quantization parameter may be used not only to determine whether to perform filtering, but also to determine which colour component of the colour information is filtered.

Specifically, in the disclosure, if the quantization parameter is greater than a quantization threshold, a first colour component of all colour components of the point in the reconstructed point cloud can be determined to be filtered. If the quantization parameter is less than or equal to the quantization threshold, a second colour component of all colour components of the point in the reconstructed point cloud can be determined to be filtered, where the first colour component is different from the second colour component.

For example, in the disclosure, in the case of the large quantization step size, only the Y component with large fluctuation can be filtered. In the case of the small quantization step, only UV components can be filtered.

Further, in embodiments of the disclosure, the decoder may also decode the bitstream to determine information indicating an optimal filter type and a filtering coefficient corresponding to the optimal filter type, where the optimal filter type may be one of at least one filter type supported by the decoding.

Accordingly, in embodiments of the disclosure, at the decoding end, two or more filters with different orders, such as two filters with orders k1=16 and k2=128, can be arranged. Then, one filter corresponding to the optimal filter type required in filtering and the filtering coefficient corresponding to the optimal filter type can be determined by decoding the bitstream. As such, the reconstructed point cloud can be filtered by using the filter and the filtering coefficient, to achieve higher filtering performance.

That is, at the encoding end, multiple different filters can be used to determine the filtering coefficient and perform filtering respectively, and finally the filter with the best filtering effect can be selected. The information and filtering coefficient corresponding to the filter can be signalled into the bitstream. As such, the information and filtering coefficient of the filter with the best filtering effect can be obtained directly by decoding the bitstream at the decoding end, and then the filter can be used for filtering, to improve filtering performance and encoding and decoding efficiency.

Furthermore, in embodiments of the disclosure, since the output of the colour transform is integer, there will be information loss in the transform process. Therefore, at the decoding end, the point cloud sequence of YUV attribute can be directly output without transforming from YUV to RGB at the decoding end, thereby improving the decoding performance and effect.

In conclusion, for the point cloud decoding method provided in the operations at blocks 101 to 106, when filtering the colour components (such as Y component, U component, and V component) of the reconstructed value of the colour of the point cloud sequence, the quality enhancement can be selectively performed on the reconstructed point cloud output from the decoding end. As such, less number of bits of the bitstream is increased, and the compression performance can be improved.

It should be noted that the point cloud decoding method provided in the disclosure is suitable for any point cloud sequence, especially, for the sequence with dense distribution of points and the sequence with low bitrate, the optimization effect is outstanding.

Furthermore, for the point cloud decoding method provided in the disclosure, all three colour attribute transform decoding modes (predicting transform, lifting transform, RAHT) are applicable, which has universality. Moreover, the filtering process will not affect the reconstruction process of the point cloud and will not cause other negative effects.

It should be noted that the filter provided in embodiments of the disclosure can be used in the prediction loop, that is, used as an in-loop filter, and can be used as a reference for decoding subsequent points in the point cloud. The filter can also be used outside the prediction loop, that is, used as a post filter, and is not used as a reference for decoding subsequent points in the point cloud. The disclosure is not limited.

It should be noted that, in the disclosure, if the filter provided in embodiments of the disclosure is the in-loop filter, after determining to perform filtering, parameter information indicating the filtering, such as the filtering flag information and/or the filtering index parameter, needs to be signalled into the bitstream, and the filtering coefficient also need to be signalled into the bitstream. Accordingly, after determining not to perform filtering, parameter information indicating no filtering, such as the filtering flag information and/or the filtering index parameter, may not be signalled into the bitstream, and the filtering coefficient may also not be signalled into the bitstream.

It should be noted that, in the disclosure, assume the filter provided in embodiments of the disclosure is a post-processing filter. In one case, the filtering coefficient corresponding to the filter is located in one separate auxiliary information data unit (for example, supplemental enhancement information, SEI), and parameter information indicating no filtering, such as the filtering flag information and/or the filtering index parameter, may not be signalled into the bitstream, and the filtering coefficient may not be signalled into the bitstream. Accordingly, the decoder does not filter the reconstructed point cloud before obtaining the supplemental enhancement information. In another case, the filtering coefficient corresponding to the filter and other information are in one auxiliary information data unit. In this case, after determining to perform the filtering, parameter information indicating the filtering, such as the filtering flag information and/or the filtering index parameter, needs to be signalled into the bitstream, and the filtering coefficient also need to be signalled into the bitstream. Accordingly, after determining not to perform the filtering, parameter information indicating no filtering, such as the filtering flag information and/or the filtering index parameter, may not to be signalled into the bitstream, and the filtering coefficient may also not be signalled into the bitstream.

Further, in the point cloud encoding and decoding method provided in embodiments of the disclosure, one or more parts of the reconstructed point cloud can be selected to be filtered, that is, the filtering flag information and/or the filtering index parameter can be applied to the whole reconstructed point cloud or a certain part of the reconstructed point cloud.

The point cloud encoding and decoding method is disclosed in embodiments of the disclosure. The decoder decodes the bitstream to determine the filtering flag information corresponding to the initial point cloud, where the filtering flag information is used for determining whether to filter the reconstructed point cloud corresponding to the initial point cloud, determines the filtering coefficient when the filtering flag information indicates to filter the reconstructed point cloud, obtains the filtered point cloud corresponding to the reconstructed point cloud with the filtering coefficient, and updates the reconstructed point cloud with the filtered point cloud. That is, for the point cloud encoding and decoding method provided in the disclosure, at the encoding end, the filtering coefficient for filtering is calculated with the initial point cloud and the reconstructed point cloud, and after the reconstructed point cloud is determined to be filtered, the filtering coefficient is transmitted to the decoding end. Accordingly, the decoding end can directly decode to obtain the filtering coefficient, and use the filtering coefficient to filter the reconstructed point cloud, which can optimize the reconstructed point cloud, improve the quality of the point cloud, and greatly improve the encoding and decoding efficiency.

Figure 6:
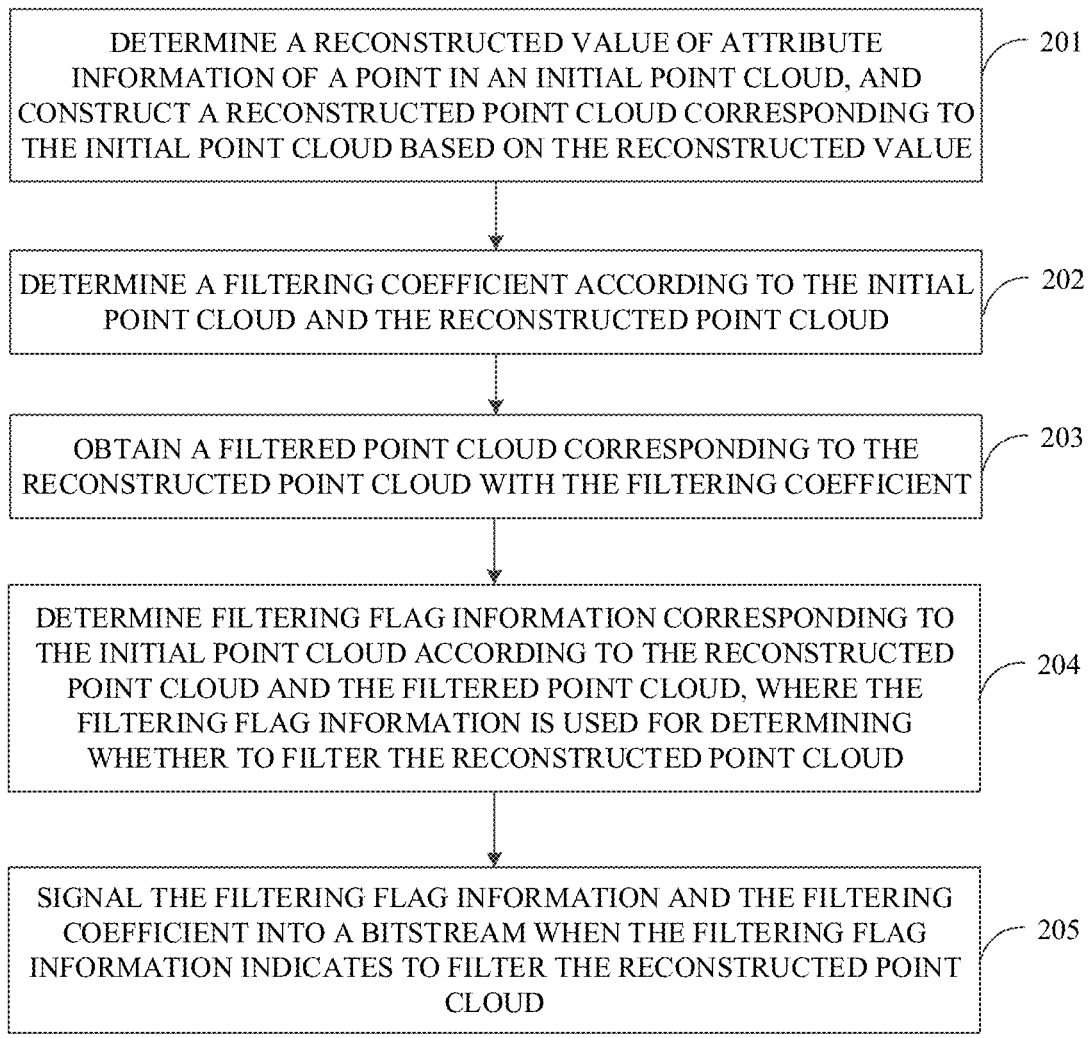
FIG. 6 is schematic flow chart 1 of point cloud encoding.

Embodiments of the disclosure provide a point cloud encoding method. The point cloud encoding method is applied to a point cloud encoder. FIG. 6 is schematic flow chart 1 of point cloud encoding. As illustrated in FIG. 6, in embodiments of the disclosure, the point cloud encoding method performed by the encoder may include the following.

At block 201, a reconstructed value of attribute information of a point in an initial point cloud is determined, and a reconstructed point cloud corresponding to the initial point cloud is constructed based on the reconstructed value.

In embodiments of the disclosure, the reconstructed value of the attribute information of the point in the initial point cloud can be determined, and then the reconstructed point cloud corresponding to the initial point cloud can be constructed based on the reconstructed value of the attribute information of the point.

It should be noted that, in embodiments of the disclosure, for a point in the initial point cloud, when encoding the point, the point can be used as a point to-be-encoded in the initial point cloud and there are multiple encoded points around the point.

Further, in embodiments of the disclosure, a point in the initial point cloud has one geometry information and one attribute information, where the geometry information represents the spatial position of the point and the attribute information represents the reconstructed attribute value of the point.

It should be noted that in embodiments of the disclosure, the attribute information may include colour information. The attribute information may be colour information in any colour space, for example, the attribute information may be colour information in an RGB space, colour information in a YUV space, or colour information in a YCbCr space, which is not limited in the disclosure.

Further, in embodiments of the disclosure, if the attribute information is the colour information in the RGB space, the colour component includes an R component, a G component, and a B component. If the attribute information is the colour information in the YUV space, the colour component includes a Y component, a U component, and a V component. If the attribute information is the colour information in the YCbCr space, the colour component includes a Y component, a Cb component, and a Cr component.

It can be understood that, in embodiments of the disclosure, for a point in the initial point cloud, the attribute information of the point may be an encoded reconstructed attribute value, where the attribute information may be colour information, or may be reflectivity or other attributes, which is not limited in the disclosure.

Further, in embodiments of the disclosure, for a point in the initial point cloud, the residual value and the prediction value corresponding to the attribute information of the point can be determined, and then the reconstructed value of the attribute information of the point can be calculated with the residual value and the prediction value.

In embodiments of the disclosure, for a point in the initial point cloud, when determining the prediction value corresponding to the attribute information of the point, the geometry information and attribute information of multiple target neighbor points of the point as well as the geometry information of the point can be used to predict the attribute information of the current point, to obtain the corresponding prediction value.

It will be understood that, in embodiments of the disclosure, for a point in the initial point cloud, after the reconstructed value of the attribute information of the point is determined, the point can be used as the nearest neighbor of the subsequent point in the LOD, to continue the attribute prediction of the subsequent point with the reconstructed value of the attribute information of the point.

Further, in embodiments of the disclosure, after the reconstructed values of the attribute information of the points in the initial point cloud are determined, the corresponding reconstructed point cloud can be determined with the reconstructed value of the attribute information of each point in the initial point cloud.

It should be noted that in the disclosure, the initial point cloud can be obtained directly by the coding program: the point cloud reading function, and the reconstructed point cloud corresponding to the initial point cloud is obtained after attribute encoding, attribute reconstruction, and geometry offset.

At block 202, a filtering coefficient is determined according to the initial point cloud and the reconstructed point cloud.

In embodiments of the disclosure, after the reconstructed value of the attribute information of the point in the initial point cloud is determined and the reconstructed point cloud corresponding to the initial point cloud is constructed based on the reconstructed value, the filtering coefficient for filtering may be further determined according to the initial point cloud and the corresponding reconstructed point cloud. The filtering coefficient may be the filtering coefficient for filtering.

It should be noted that in embodiments of the disclosure, the filtering coefficient may be used for Wiener filtering, i.e., the filtering coefficient is the coefficient of Wiener filter.

Wiener filter is a linear filter with the least square as the optimal criterion. Under certain constraints, the square of the difference between its output and a given function (generally called expected output) is minimized, which can eventually become a problem of solving Toeplitz equation through mathematical operation. Wiener filter is also called least square filter.

Wiener filtering is one of the basic filtering methods, which makes use of the correlation characteristics and spectrum characteristics of stationary random process to filter the signal mixed with noise. The specific algorithm of Wiener filtering is as follows.

$$y(n)=\Sigma_{m=0}^{M}=h(m)\times(n-m) \quad (1)$$

M is the length or order of the filter, y(n) is the output signal, and x(n) is a column of input signals (mixed with noise).

Convert formula (1) to formula form.

$$y(n)=H(m)\times X(n) \quad (2)$$

If the known signal is y(n) and the desired signal is d(n), the error e(n) between the known signal and the desired signal can be calculated as follows.

$$e(n)=d(n)-y(n)=d(n)-H(m)\times X(n), m=0,1,\ldots M \quad (3)$$

Wiener filter takes the minimum mean square error as the objective function, so the objective function is as follows.

$$\text{Min } E(e(n)^2)=E[(d(n)-H(m)\times X(n))^2] \quad (4)$$

When the filtering coefficient is optimal, the derivative of the objective function to the coefficient should be 0 that is:

$$\frac{d(E(e(n)^2))}{dH}=0 \quad (5)$$

That is:

$$2E[(d(n)-H(m)\times X(n))]\times X(n)=0 \quad (6)$$

$$E[d(n)X(n)]-H(m)E[X(n)X(n)]=0 \quad (7)$$

It can be further expressed as follows.

$$Rxd-H\times Rxx=0 \quad (8)$$

where Rxd is the correlation matrix between the input signal and the desired signal and Rxx is the auto-correlation matrix of the input signal. Therefore, the filtering coefficient H can be obtained from Wiener-Hough equation.

$$H=Rxx^\wedge(-1)\times Rxd \quad (9)$$

Further, in the disclosure, if the attribute information is colour information in any space, for example, the attribute information is colour information in the YUV space, when determining the filtering coefficient according to the initial point cloud and the reconstructed point cloud, the first attribute parameter and the second attribute parameter of the colour component can be determined based on the initial component value and the reconstructed component value of the colour component (such as Y component, U component, V component) as well as the filter type. Then, the filtering coefficient for filtering can be further determined according to the first attribute parameter and the second attribute parameter.

It should be noted that in embodiments of the disclosure, the first attribute parameter is used for determining the attribute value of the colour component of the point in the initial point cloud. The second attribute parameter is used for determining the attribute value of the colour component of the point in the reconstructed point cloud. The first attribute parameter represents the colour attribute value of the point in the initial point cloud under one colour component. The second attribute parameter represents the colour attribute values of the point in the reconstructed point cloud and its k neighboring points under one colour component.

Further, in embodiments of the disclosure, the filter type may be used to indicate a filter order and/or a filter shape and/or a filter dimension. The filter shape includes diamond, rectangle, and the like. The filter dimension includes one-dimensional and multi-dimensional.

That is, in the disclosure, different filter types may correspond to filters with different orders, for example, filters with orders k of 16, 32, 128. Different filter types can also correspond to filters with different dimensions, for example, one-dimensional filter, two-dimensional filter and multi-dimensional filter. In the case of two-dimensional and multi-dimensional filters, different filter types may also indicate different filter shapes employed. For example, diamond filter, rectangular filter, etc.

Specifically, in embodiments of the disclosure, when determining the filtering coefficient according to the initial point cloud and the reconstructed point cloud, the first attribute parameter of the colour component can be determined according to the initial component attribute value of the colour component of the colour information of the point in the initial point cloud. Meanwhile, the second attribute parameter of the attribute information matrix corresponding to the colour component can be determined according to the reconstructed component value of the colour component of the colour information of the point in the reconstructed point cloud and the filter order and filter type. Finally, the filtering coefficient can be determined based on the first attribute parameter and the second attribute parameter.

In the disclosure, the first attribute parameter and the second attribute parameter corresponding to one colour component are calculated, and the filtering coefficient vector corresponding to the colour component is determined with the first attribute parameter and the second attribute parameter. After all the colour components are traversed and the filtering coefficient vector of each colour component is obtained, the filtering coefficient can be finally determined based on the filtering coefficient vector of each colour component.

Specifically, in embodiments of the disclosure, when determining the filtering coefficient according to the initial point cloud and the reconstructed point cloud, a cross-correlation parameter corresponding to the colour component can be determined according to the first attribute parameter and the second attribute parameter corresponding to the colour component. Meanwhile, an auto-correlation parameter corresponding to the colour component can be determined according to the second attribute parameter. Then, the filtering coefficient vector corresponding to the colour component can be determined based on the cross-correlation parameter and the auto-correlation parameter. Finally, all the colour components can be traversed, and the filtering coefficient can be determined with the filtering coefficient vectors corresponding to all the colour components.

For example, in the disclosure, taking the colour information in the YUV space in the point cloud sequence as an example, assume that the filter order indicated by the filter type is k, that is, using k neighbor points of a point in the point cloud to calculate the filtering coefficient, that is, calculating the filtering coefficient. Assume that the point cloud sequence is n, a vector S(n) is used to represent the colour attribute value of the point in the initial point cloud under one colour component (such as Y component), i.e., S(n) is the first attribute parameter including the initial component value of the Y component of the colour information of the point in the initial point cloud, and a matrix P(n, k) is used to represent the colour attribute value of the point in the reconstructed point cloud and its k neighboring points under the same colour component (e.g., Y component), i.e., P(n, k) is the second attribute parameter determined by the reconstructed component value of the Y component of the colour information of the point in the reconstructed point cloud and the filter type.

Further, the cross-correlation parameter B(k) may be calculated according to the first attribute parameter S(n) and the second attribute parameter P(n, k) in accordance with the following formula.

$$B(k)=P(n,k)^T \times S(n) \qquad (10)$$

The auto-correlation parameter A(k, k) can be calculated according to the second attribute parameter P(n, k) in accordance with the following formula.

$$A(k,k)=P(n,k)^T \times P(n,k) \qquad (11)$$

According to Wiener-Hough equation, the filtering coefficient under the Y component, that is, the filtering coefficient vector H(k) of k-order filter under the Y component is as follows.

$$H(k)=A(k,k)^{-1} \times B(k) \qquad (12)$$

Then, the U component and the V component can be traversed in the above method, and finally the filtering coefficient vector under the U component and the filtering coefficient vector under the V component can be determined, and then the filtering coefficient can be obtained with the filtering coefficient vectors under all colour components.

Thus, in the disclosure, when determining the filtering coefficient with the initial point cloud and the corresponding reconstructed point cloud, the first attribute parameter and the second attribute parameter corresponding to each colour component can be respectively determined based on the colour information of the points in the initial point cloud and the reconstructed point cloud. Then, the filtering coefficient vector corresponding to each colour component can be determined. Finally, the filtering coefficient can be obtained according to the filtering coefficient vectors of all colour components.

At block 203, a filtered point cloud corresponding to the reconstructed point cloud is obtained with the filtering coefficient.

In embodiments of the disclosure, after determining the filtering coefficient according to the initial point cloud and the reconstructed point cloud, the encoder can further obtain the filtered point cloud corresponding to the reconstructed point cloud by using the filtering coefficient.

Further, in embodiments of the disclosure, when filtering the reconstructed point cloud with the filtering coefficient, the filtered value of the attribute information corresponding to the colour component can be determined according to the filtering coefficient vector corresponding to the colour component and the second attribute parameter. Then, the filtered point cloud can be constructed based on the filtered value of the attribute information of the colour component.

It can be understood that, in embodiments of the disclosure, the noisy signal and the desired signal are required when the filter is used to filter the reconstructed point cloud. In the point cloud encoding and decoding framework, the reconstructed point cloud can be taken as the noisy signal and the initial point cloud as the desired signal. Therefore, both the initial point cloud and the reconstructed point cloud can be input into the filter, i.e., the input of the filter is the initial point cloud and the reconstructed point cloud. After the filtering coefficient of the filter, i.e., the filtering coefficient, is calculated, the filtering of the reconstructed point cloud can be completed based on the filtering coefficient to obtain the corresponding filtered point cloud.

It should be noted that in the disclosure, the filtering parameter is obtained based on the original point cloud and the reconstructed point cloud, so the original point cloud can be restored to the maximum extent by applying the filtering coefficient to the reconstructed point cloud.

Specifically, in the disclosure, when filtering the reconstructed point cloud according to the filtering coefficient, for one colour component of the colour information, the filtered value of the attribute information corresponding to the colour component can be determined based on the filtering coefficient vector corresponding to the colour component of the filtering coefficient and the second attribute parameter corresponding to the colour component.

As an example, in the disclosure, by applying the filtering coefficient vector H(k) under the Y component to the corresponding second attribute parameter P(n, k), the filtered value R(n) of the attribute information under the Y component can be obtained as follows.

$$R(n)=P(n,k) \times H(k) \qquad (13)$$

Then, the U component and the V component can be traversed according to the above method, and finally the filtered value of the attribute information under the U component and the filtered value of the attribute information under the V component can be determined. As such, the filtered point cloud corresponding to the reconstructed point cloud can be constructed with the filtered values of the attribute information under all colour components.

At block 204, filtering flag information corresponding to the initial point cloud is determined according to the reconstructed point cloud and the filtered point cloud, where the filtering flag information is used for determining whether to filter the reconstructed point cloud.

In embodiments of the disclosure, after the encoder obtains the filtered point cloud corresponding to the reconstructed point cloud with the filtering coefficient, the encoder can further determine the filtering flag information corresponding to the initial point cloud according to the reconstructed point cloud and the filtered point cloud.

It should be noted that in embodiments of the disclosure, the filtering flag information may be used to determine whether to filter the reconstructed point cloud. The filtering flag information may also be used to determine which colour component in the reconstructed point cloud is to be filtered.

Further, in embodiments of the disclosure, when determining the filtering flag information corresponding to the initial point cloud according to the reconstructed point cloud and the filtered point cloud, a first performance parameter of the colour component of the point in the reconstructed point cloud and a second performance parameter of the colour component of the point in the filtered point cloud can be determined. Then, identification information corresponding to the colour component can be determined according to the first performance parameter and the second performance parameter. Finally, the filtering flag information can be determined with the identification information of the colour component.

It will be appreciated that in embodiments of the disclosure, the first performance parameter and the second performance parameter may represent encoding performance of the reconstructed point cloud and the filtered point cloud under the same colour component, respectively.

As an example, in the disclosure, the first performance parameter may be peak signal-to-noise ratio (PSNR) under the colour component of the point in the reconstructed point cloud, and the second performance parameter may be PSNR under the colour component of the point in the filtered point cloud.

Specifically, in embodiments of the disclosure, the PSNR under the Y component is taken as an example. When determining the identification information corresponding to the colour component according to the first performance parameter and the second performance parameter, if PSNR1 corresponding to the reconstructed point cloud is greater than PSNR2 corresponding to the filtered point cloud, that is, the PSNR of the filtered Y component decreases, the filtering effect can be poor, and thus the value of the identification information corresponding to the Y component can be set to indicate not to filter the Y component. Accordingly, if PSNR1 corresponding to the reconstructed point cloud is less than PSNR2 corresponding to the filtered point cloud, that is, the PSNR of the filtered Y component increases, the filtering effect can be good, and thus the value of the identification information corresponding to the Y component can be set to indicate to filter the Y component.

Furthermore, in embodiments of the disclosure, the U component and the V component can be traversed according to the above method, and finally the identification information corresponding to the U component and the identification information corresponding to the V component can be determined. As such, the filter flag information can be determined with the identification information corresponding to all colour components.

It can be seen that, because the filtering flag information is determined based on the identification information corresponding to each colour component, the filtering flag information can be used not only to determine whether or not to filter the reconstructed point cloud, but also to determine which colour component is to be filtered.

In the disclosure, if the value of the identification information is a first value, indicate not to filter the colour component. If the value of the identification information is a second value, indicate to filter the colour component.

Further, in the disclosure, if all identification information of colour components is the first value, that is, indicating that each colour component is not filtered, determine that the filtering flag information indicates not to filter the reconstructed point cloud. Accordingly, if not all identification information of colour components is the first value, that is, indicating that at least one colour component is filtered, determine that the filtering flag information indicates to filter the reconstructed point cloud.

Exemplarily, in the disclosure, the first value is equal to 0 and the second value is equal to 1. Alternatively, the first value is set to "false" and the second value is set to "true".

At block 205, the filtering flag information and the filtering coefficient are signalled into a bitstream when the filtering flag information indicates to filter the reconstructed point cloud.

In embodiments of the disclosure, after the encoder determines the filtering flag information corresponding to the initial point cloud according to the reconstructed point cloud and the filtered point cloud, if the filtering flag information indicates to filter the reconstructed point cloud, the encoder can signal the filtering coefficient into the bitstream, and can also signal the filtering flag information into the bitstream.

It can be understood that, in the disclosure, if the filtering flag information indicates to filter the reconstructed point cloud, the filtering flag information indicating whether to filter the reconstructed point cloud or not and the filtering parameter for filtering the reconstructed point cloud need to be signalled into the bitstream and transmitted to the decoding end.

It should be noted that in embodiments of the disclosure, the encoder can also signal the residual value of the attribute information of the point in the initial point cloud into the bitstream and transmit it to the decoding end.

Figure 7:
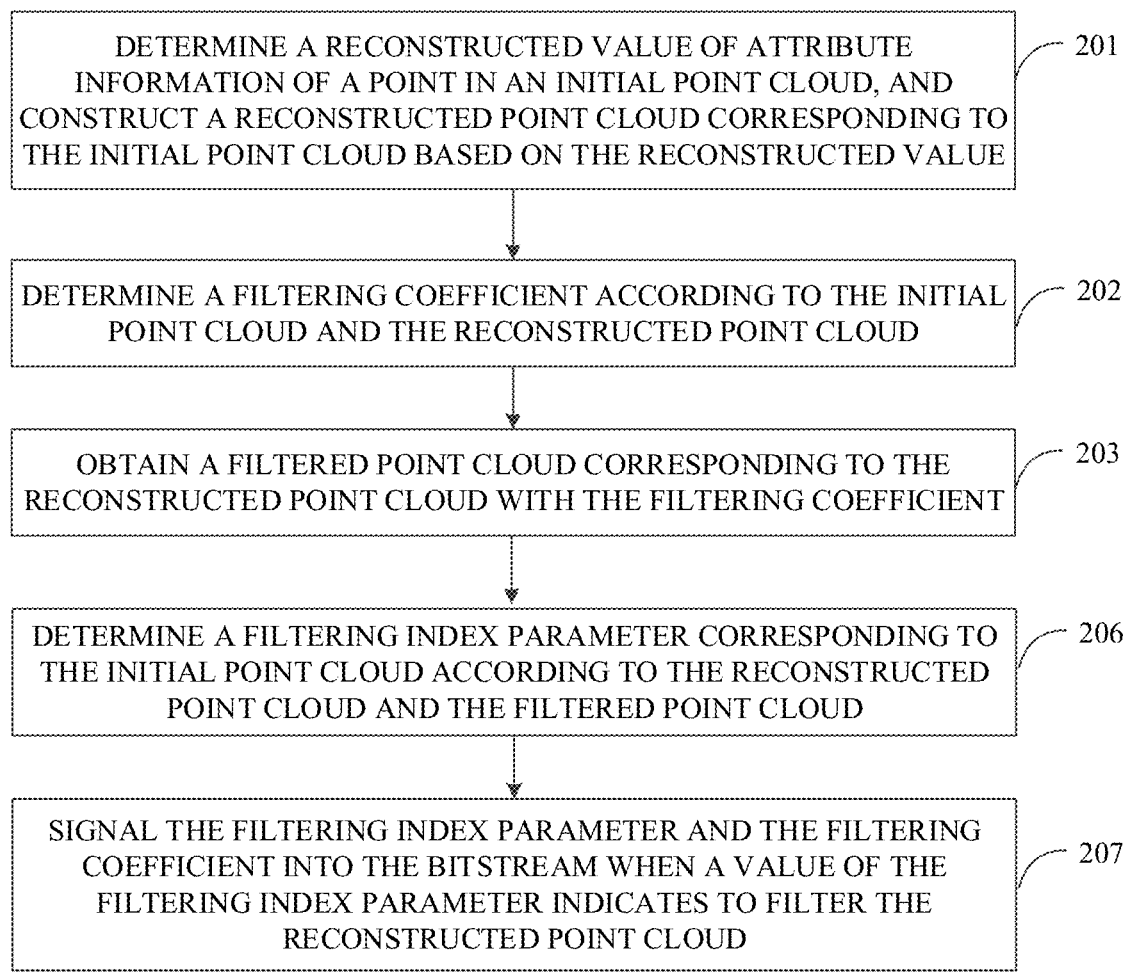
FIG. 7 is schematic flow chart 2 of point cloud encoding.

Further, in embodiments of the disclosure, FIG. 7 is schematic flow chart 2 of point cloud encoding. As illustrated in FIG. 7, after obtaining the filtered point cloud corresponding to the reconstructed point cloud with the filtering coefficient, that is, after the operation at block 203, the point cloud encoding method performed by the encoder may further include the following.

At block 206, a filtering index parameter corresponding to the initial point cloud is determined according to the reconstructed point cloud and the filtered point cloud.

At block 207, the filtering index parameter and the filtering coefficient are signalled into the bitstream if a value of the filtering index parameter indicates to filter the reconstructed point cloud.

In embodiments of the disclosure, after obtaining the filtered point cloud corresponding to the reconstructed point cloud with the filtering coefficient, the encoder can further determine the filtering index parameter corresponding to the initial point cloud according to the reconstructed point cloud and the filtered point cloud. If the value of the filtering index parameter indicates to filter the reconstructed point cloud, the filtering coefficient can be signalled into the bitstream and transmitted to the decoding end, and the filtering index parameter can also be signalled into the bitstream.

It should be noted that in embodiments of the disclosure, the filtering index parameter may be used to determine whether to filter the reconstructed point cloud. The filtering flag information may also be used to determine the filter to be used for filtering.

It can be understood that in embodiments of the disclosure, the value of the filtering index parameter may be set based on the reconstructed point cloud and the filtered point cloud, so that the filtering index parameter may be used to determine whether to filter the reconstructed point cloud.

Exemplarily, in embodiments of the disclosure, if the value of the filtering index parameter is equal to 0, determine not to filter the reconstructed point cloud; if the value of the filtering index parameter is not equal to 0 (for example, 1, 2, 3, etc.), determine to filter the reconstructed point cloud.

Further, in embodiments of the disclosure, when determining the filter by using the filtering index parameter, if the value of the filtering index parameter is equal to 1, determine to filter the reconstructed point cloud with a one-dimensional filter. If the value of the filtering index parameter is equal to 2, determine to filter the reconstructed point cloud with a two-dimensional filter, where the two-dimensional filter is any one of diamond filter and rectangular filter. Alternatively, if the value of the filtering index parameter is equal to 2, determine to filter the reconstructed point cloud with a multi-dimensional filter. That is, the value of the filtering index parameter being equal to 0 means that the reconstructed point cloud is not filtered, and when the value of the filtering index parameter is not equal to 0, different values mean different filters used to filter the reconstructed point cloud.

Thus, in embodiments of the disclosure, it is possible to determine whether or not to filter the reconstructed point cloud with "flag" (e.g., filtering flag information) or "index" (e.g., filtering index parameter). That is, the specific form of determining whether or not to perform filtering is not limited in the disclosure.

Further, in embodiments of the disclosure, after determining the filtering flag information corresponding to the initial point cloud according to the reconstructed point cloud and the filtered point cloud, if the filtering flag information indicates not to filter the reconstructed point cloud, then the filtering coefficient may not be signalled into the bitstream. Alternatively, after determining the filtering index parameter corresponding to the initial point cloud according to the reconstructed point cloud and the filtered point cloud, if the value of the filtering index parameter indicates not to filter the reconstructed point cloud, the filtering coefficient may not be signalled into the bitstream.

It can be understood that in the disclosure, if the filtering flag information indicates not to filter the reconstructed point cloud, or if the value of the filtering index parameter indicates not to filter the reconstructed point cloud, the filtering flag information or the filtering index parameter may not be signalled into the bitstream.

Further, in embodiments of the disclosure, when determining whether to filter the reconstructed point cloud, the quantization parameter may also be introduced, that is, whether to perform filtering may be further determined with the quantization parameter as well as the filtering flag information and/or the filtering index parameter.

In the disclosure, the quantization parameter of the initial point cloud can be determined. Then, whether to filter the reconstructed point cloud is determined according to the quantization parameter, the filtering flag information, and/or the filtering index parameter. The quantization parameter can characterize quantization step size.

It can be understood that in the disclosure, when determining whether to perform filtering on the reconstructed point cloud according to the quantization parameter, the filtering flag information, and/or the filtering index parameter, whether to perform filtering can be determined based on the quantization parameter, the filtering flag information, and/or the filtering index parameter, respectively. When the quantization parameter, the filtering flag information, and the filtering index parameter all indicate to perform filtering, it can be determined to perform filtering on the reconstructed point cloud, and signal the filtering parameter into the bitstream. Alternatively, when at least one of the quantization parameter, the filtering flag information, or the filtering index parameter indicates to perform filtering, it can be determined to perform filtering on the reconstructed point cloud, and signal the filtering parameter into the bitstream.

Alternatively, in embodiments of the disclosure, the quantization parameter may be used not only to determine whether to perform filtering, but also to determine which colour component of the colour information is filtered.

Specifically, in the disclosure, if the quantization parameter is greater than a quantization threshold, a first colour component of all colour components of the point in the reconstructed point cloud can be determined to be filtered. If the quantization parameter is less than or equal to the quantization threshold, a second colour component of all colour components of the point in the reconstructed point cloud can be determined to be filtered, where the first colour component is different from the second colour component.

For example, in the disclosure, in the case of the large quantization step size, only the Y component with large fluctuation can be filtered. In the case of the small quantization step, only UV components can be filtered.

Furthermore, in embodiments of the disclosure, at the encoding end, two or more filters with different orders, such as two filters with orders k1=16 and k2=128, can be arranged, and then the reconstructed point cloud can be filtered with the two filters respectively. Combining the final quality improvement, the running time, and the number of bits, a filter with better performance is selected, and the order and filtering coefficient corresponding to the filter are signalled into the bitstream, indicating that the filter is used for filtering at the decoding end.

Specifically, in the disclosure, when determining the filtering coefficient, at least one second attribute parameter corresponding to the colour component can be constructed according to the reconstructed component value of the colour component of the colour information of the point in the reconstructed point cloud and at least one filter type, that is, the second attribute parameter corresponding to each filter type can be determined based on the reconstructed component value of the same colour component. Then, the filtering coefficient vector corresponding to each filter type under the colour component can be determined in combination with the first attribute parameter corresponding to the colour component. After all the colour components are traversed, the filtering coefficient(s) corresponding to each filter type can be obtained, that is, at least one group of filtering coefficients corresponding to at least one filter type can be determined, where one filter type corresponds to one group of filtering coefficients.

Accordingly, in embodiments of the disclosure, after determining the at least one group of filtering coefficients corresponding to the at least one filter type, the reconstructed point cloud can be respectively filtered based on the at least one filter type with the at least one group of filtering coefficients. That is, the reconstructed point cloud can be respectively filtered with different filters and corresponding filtering coefficients, so that at least one filtered point cloud corresponding to the at least one filter type can be obtained, where one filter type corresponds to one filtered point cloud.

Further, in the disclosure, an optimal filter type may be selected from the at least one filter type based on the at least one filtered point cloud. Then, information indicating the optimal filter type and the filtering coefficient corresponding to the optimal filter type may be signalled into the bitstream.

That is, at the encoding end, multiple different filters can be used to determine the filtering coefficient and perform filtering respectively, and finally the filter with the best filtering effect can be selected. The information and filtering coefficient corresponding to the filter can be signalled into the bitstream. As such, the information and filtering coefficient of the filter with the best filtering effect can be obtained directly by decoding the bitstream at the decoding end, and then the filter can be used for filtering, to improve filtering performance and encoding and decoding efficiency.

In conclusion, for the point cloud encoding method provided in the operations at blocks 201 to 207, when filtering the colour components (such as Y component, U component, and V component) of the reconstructed value of the colour of the point cloud sequence, the quality enhancement can be selectively performed on the reconstructed point cloud. As such, less number of bits of the bitstream is increased, and the compression performance can be improved.

It should be noted that the point cloud encoding method provided in the disclosure is suitable for any point cloud sequence, especially, for the sequence with dense distribution of points and the sequence with low bitrate, the optimization effect is outstanding.

Furthermore, for the point cloud encoding method provided in the disclosure, all three colour attribute transform encoding modes (predicting transform, lifting transform, RAHT) are applicable, which has universality. Moreover, the filtering process will not affect the reconstruction process of the point cloud and will not cause other negative effects.

It should be noted that the filter provided in embodiments of the disclosure can be used in the prediction loop, that is, used as an in-loop filter, and can be used as a reference for encoding subsequent points in the point cloud. The filter can also be used outside the prediction loop, that is, used as a post filter, and is not used as a reference for encoding subsequent points in the point cloud. The disclosure is not limited.

It should be noted that, in the disclosure, if the filter provided in embodiments of the disclosure is the in-loop filter, after determining to perform filtering, parameter information indicating the filtering, such as the filtering flag information and/or the filtering index parameter, needs to be signalled into the bitstream, and the filtering coefficient also need to be signalled into the bitstream. Accordingly, after determining not to perform filtering, parameter information indicating no filtering, such as the filtering flag information and/or the filtering index parameter, may not be signalled into the bitstream, and the filtering coefficient may also not be signalled into the bitstream.

It should be noted that, in the disclosure, assume the filter provided in embodiments of the disclosure is a post-processing filter. In one case, the filtering coefficient corresponding to the filter is located in one separate auxiliary information data unit (for example, supplemental enhancement information, SEI), and parameter information indicating no filtering, such as the filtering flag information and/or the filtering index parameter, may not be signalled into the bitstream, and the filtering coefficient may not be signalled into the bitstream. Accordingly, the decoder does not filter the reconstructed point cloud before obtaining the supplemental enhancement information. In another case, the filtering coefficient corresponding to the filter and other information are in one auxiliary information data unit. In this case, after determining to perform the filtering, parameter information indicating the filtering, such as the filtering flag information and/or the filtering index parameter, needs to be signalled into the bitstream, and the filtering coefficient also need to be signalled into the bitstream. Accordingly, after determining not to perform the filtering, parameter information indicating no filtering, such as the filtering flag information and/or the filtering index parameter, may not to be signalled into the bitstream, and the filtering coefficient may also not be signalled into the bitstream.

Further, in the point cloud encoding and decoding method provided in embodiments of the disclosure, one or more parts of the reconstructed point cloud can be selected to be filtered, that is, the filtering flag information and/or the filtering index parameter can control the whole reconstructed point cloud or a certain part of the reconstructed point cloud.

The point cloud encoding method is disclosed in embodiments of the disclosure. The encoder determines the reconstructed value of the attribute information of the point in the initial point cloud, and constructs the reconstructed point cloud corresponding to the initial point cloud based on the reconstructed value, determines the filtering coefficient according to the initial point cloud and the reconstructed point cloud, obtains the filtered point cloud corresponding to the reconstructed point cloud with the filtering coefficient, determines the filtering flag information corresponding to the initial point cloud according to the reconstructed point cloud and the filtered point cloud, where the filtering flag information is used for determining whether to filter the reconstructed point cloud, and signals the filtering flag information and the filtering coefficient into the bitstream when the filtering flag information indicates to filter the reconstructed point cloud. That is, for the point cloud encoding and decoding method provided in the disclosure, at the encoding end, the filtering coefficient for filtering is calculated with the initial point cloud and the reconstructed point cloud, and after the reconstructed point cloud is determined to be filtered, the filtering coefficient is transmitted to the decoding end. Accordingly, the decoding end can directly decode to obtain the filtering coefficient, and use the filtering coefficient to filter the reconstructed point cloud, which can optimize the reconstructed point cloud, improve the quality of the point cloud, and greatly improve the encoding and decoding efficiency.

Figure 8:
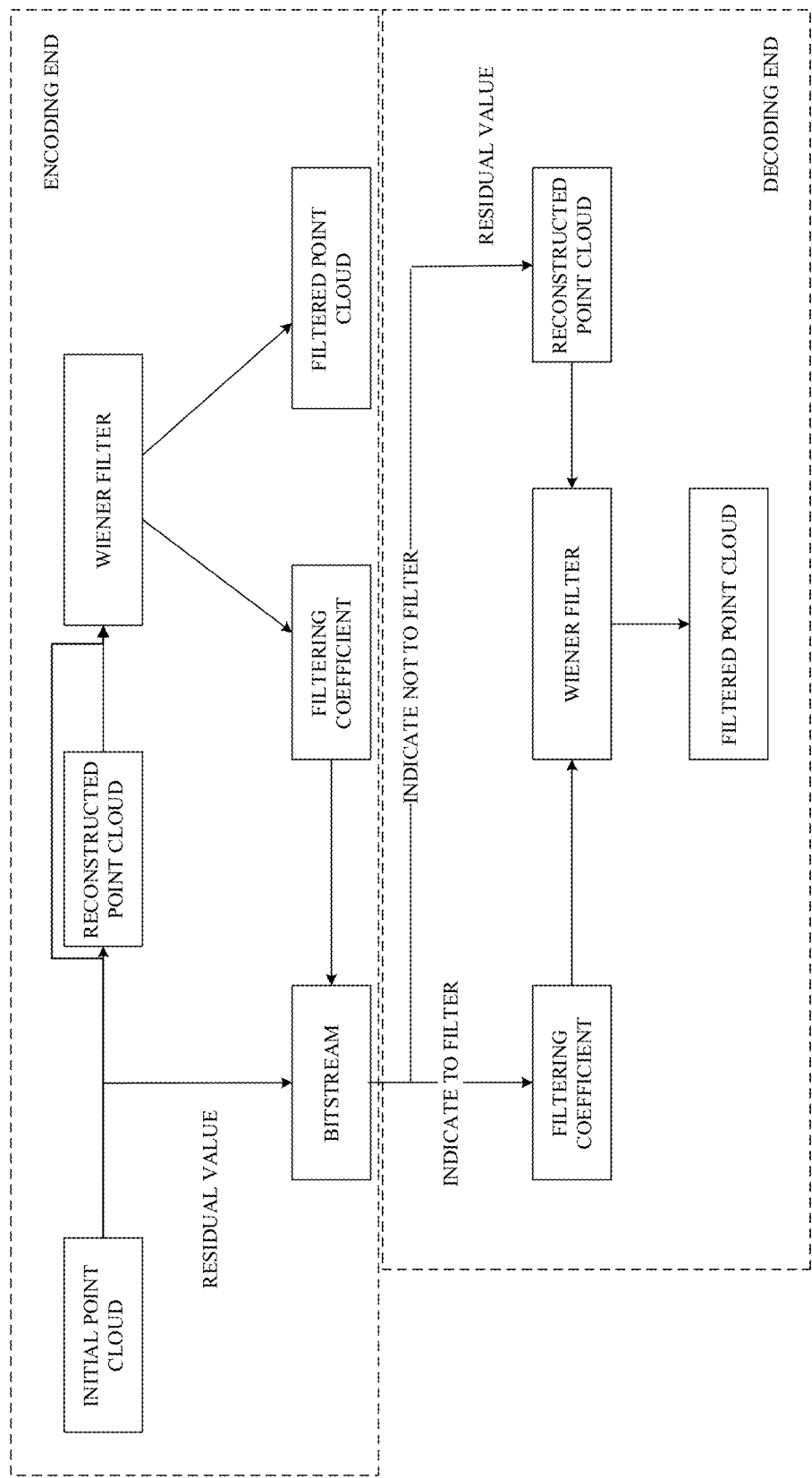
FIG. 8 is a schematic flow chart of point cloud encoding and decoding.

Based on the above embodiments, in another embodiment of the disclosure, for example, the attribute information is the colour information in the YUV space and the filtering is performed with Wiener filter. FIG. 8 is a schematic flow chart of point cloud encoding and decoding. As illustrated in FIG. 8, at the encoding end, the encoder can first obtain the input of Wiener filter, that is, the initial point cloud and the corresponding reconstructed point cloud. The initial point cloud can be obtained directly by the coding program: the point cloud reading function, and the reconstructed point cloud is obtained after attribute encoding, attribute reconstruction, and geometry offset based on the initial point cloud.

It can be understood that in embodiments of the disclosure, in the process of encoding the initial point cloud, the residual value of the attribute information of the point in the initial point cloud can be determined, and the encoder can signal the residual value into the bitstream and transmit it to the decoding end.

Furthermore, after the point cloud reconstruction is completed and the reconstructed point cloud is obtained, the Wiener filtering based on Wiener filter begins. At the encoding end, the function of Wiener filter is mainly to calculate the optimal filtering coefficient, that is, to calculate the filtering coefficient, and meanwhile, to complete the filtering of the reconstructed point cloud, and to determine whether the quality of the point cloud is improved after the Wiener filtering.

It should be noted that, in the disclosure, since the filter order k indicated by the filter type (i.e., the number k of neighbouring points selected in filtering) and the number of colour components to be filtered will affect the quality of the filtered point cloud, the filter order k=32 can be selected to give consideration to both performance and efficiency.

Specifically, in the disclosure, the filtering coefficient of Wiener filter can be calculated by applying the principle of the Wiener filter algorithm. Meanwhile, the encoding end filters the three colour components of Y, U, and V based on the obtained filtering coefficient. As such, the filtering performance on the three colour components of Y, U, and V can be obtained, and the corresponding filtered point cloud is constructed based on the filtered attribute values corresponding to the three colour components of Y, U, and V.

Figure 9:
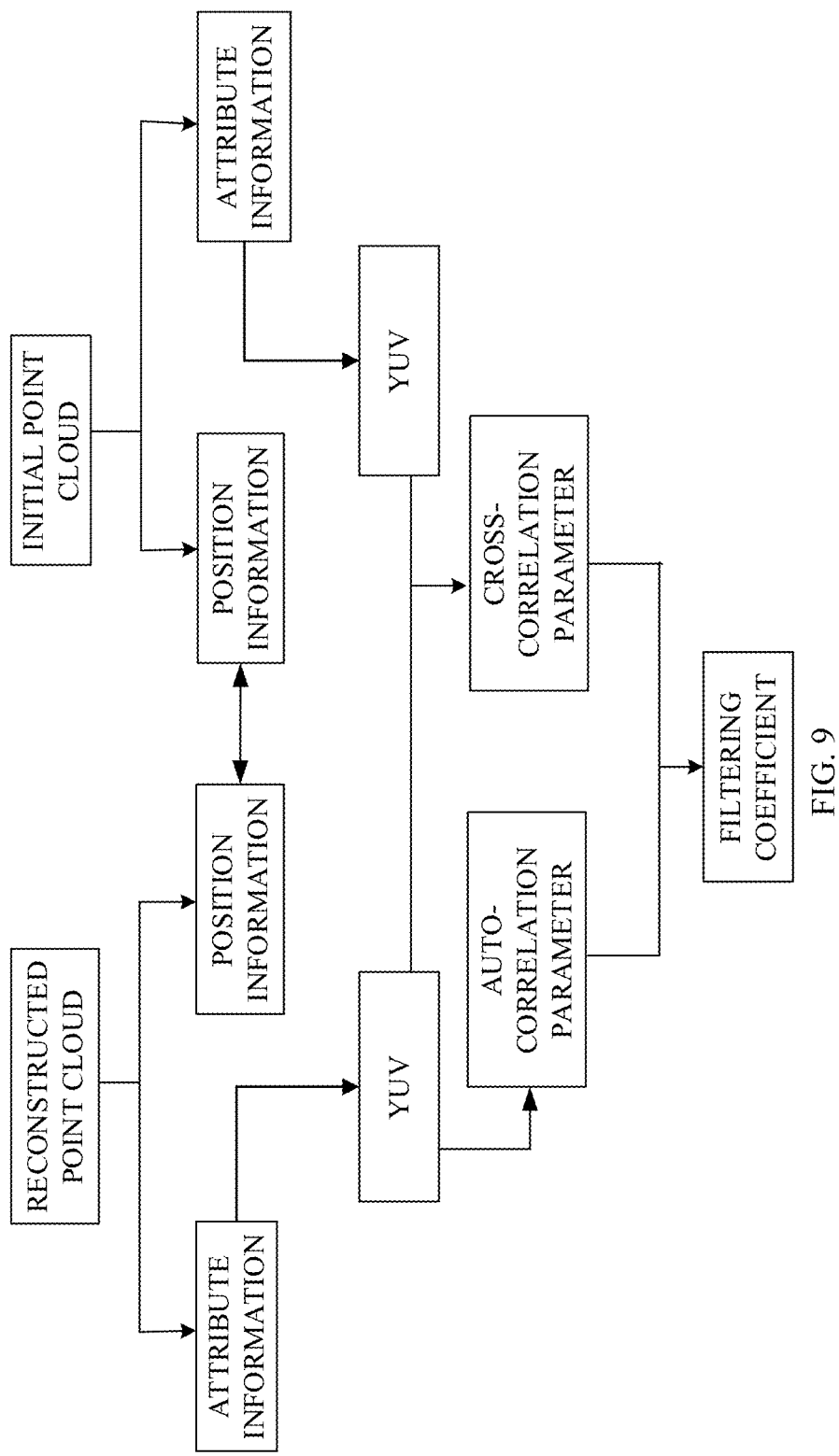
FIG. 9 is a schematic flow chart of filtering at an encoding end.

FIG. 9 is a schematic flow chart of filtering at an encoding end. As illustrated in FIG. 9, the initial point cloud and the reconstructed point cloud are used as the input of Wiener filter, and the points in the initial point cloud and the reconstructed point cloud respectively are aligned in the position information, and the attribute information is transformed (such as transforming the colour information in the attribute information from the RGB space to the YUV space). The colour information of the points in the initial point cloud and the colour information of the points in the reconstructed point cloud can be used to calculate the filtering coefficient. The auto-correlation parameter can be calculated based on the colour information of the points in the reconstructed point cloud, and the cross-correlation parameter can be calculated based on the colour information of the points in the initial point cloud and the colour information of the points in the reconstructed point cloud. Finally, the optimal filtering coefficient, that is, the corresponding filtering coefficient, can be determined with the auto-correlation parameter and the cross-correlation parameter.

It should be noted that in the disclosure, at the encoding end, it is not necessary to use the filtered point cloud to cover the reconstructed point cloud.

Further, in embodiments of the disclosure, the decoder may calculate the PSNR values (performance parameters) of the three colour components Y, U, and V in the colour information of the filtered point cloud and the reconstructed point cloud. It is possible to determine whether to filter the reconstructed point cloud based on the PSNR values of all the colour components, and determine the filtering flag information.

Alternatively, in the disclosure, if the PSNR values of one or more colour components increase, such as the PSNR values of the UV colour components increase and the PSNR value of the Y component decreases, the decoder may determine to perform filtering only for the UV components and not for the Y component, that is, set the filtering flag information to indicate to perform filtering for the UV components.

Alternatively, in the disclosure, if the PSNR values of the three colour components Y, U, and V are all decreased, the encoder may determine not to filter the three colour components Y, U, and V, i.e., the filtering flag information is set to indicate not to filter the reconstructed point cloud. Accordingly, if the PSNR values of the three colour components Y, U, and V are all increased, the encoder can determine to filter the three colour components Y, U, and V, i.e., the filtering flag information is set to indicate to filter the reconstructed point cloud.

It should be noted that in embodiments of the disclosure, the filtering flag information can be a determination array with a size of 1×3, which can be used to determine whether to filter the reconstructed point cloud or not, and can also be used to determine which colour component need to be filtered at the decoding end. The filtering flag information may include three pieces of identification information corresponding to the three colour components of Y, U, and V. The value of the identification information being equal to 0 indicates not to filter the colour component, and the value of the identification information being equal to 1 indicates to filter the colour component.

It can be understood that in the disclosure, if the three pieces of identification information corresponding to the three colour components are all 0, the filtering flag information indicates not to filter the reconstructed point cloud. If the three pieces of identification information corresponding to the three colour components are not all 0, the filtering flag information indicates to filter the reconstructed point cloud.

For example, the filtering flag information may be represented as (0, 1, 1), where the value of the identification information corresponding to the Y component is equal to 0 and the value of the identification information corresponding to each of the UV components is equal to 1. That is, the filtering flag information indicates to filter the reconstructed point cloud and indicates to filter only the UV components.

Furthermore, in the disclosure, if the PSNR values of the three colour components Y, U, and V are not increased, the filtering effect can be poor, and the quality is decreased. Therefore, the encoder may not signal the filtering coefficient into the bitstream, and meanwhile, it may choose not to signal the filtering flag information into the bitstream, thus ensuring that the Wiener filtering is not performed at the decoding end.

At the decoding end, after the residual value of the attribute information is decoded, the decoder can also decode the bitstream to determine the filtering flag information, for example, decoding to obtain a 1×3 determination array.

It can be understood that in the disclosure, if the filtering flag information indicates to filter the reconstructed point cloud, which means that the Wiener filtering will increase the quality of the reconstructed point cloud, and the encoding end has transmitted the filtering coefficient, then the decoder can continue to decode to obtain corresponding filtering coefficient. If the filtering flag information indicates not to filter the reconstructed point cloud, which means that the Wiener filtering will not increase the quality of the reconstructed point cloud, and the encoding end has not transmitted the filtering coefficient, then the decoder will not continue to decode to obtain the filtering coefficient, but skip the Wiener filtering, and reconstruct the point cloud according to the original program.

Further, in embodiments of the disclosure, after the filtering coefficient is decoded, the decoder may transmit the filtering coefficient, and after the point cloud reconstruction is completed, the reconstructed point cloud can be filtered with the filtering coefficient.

Figures 10, 11:
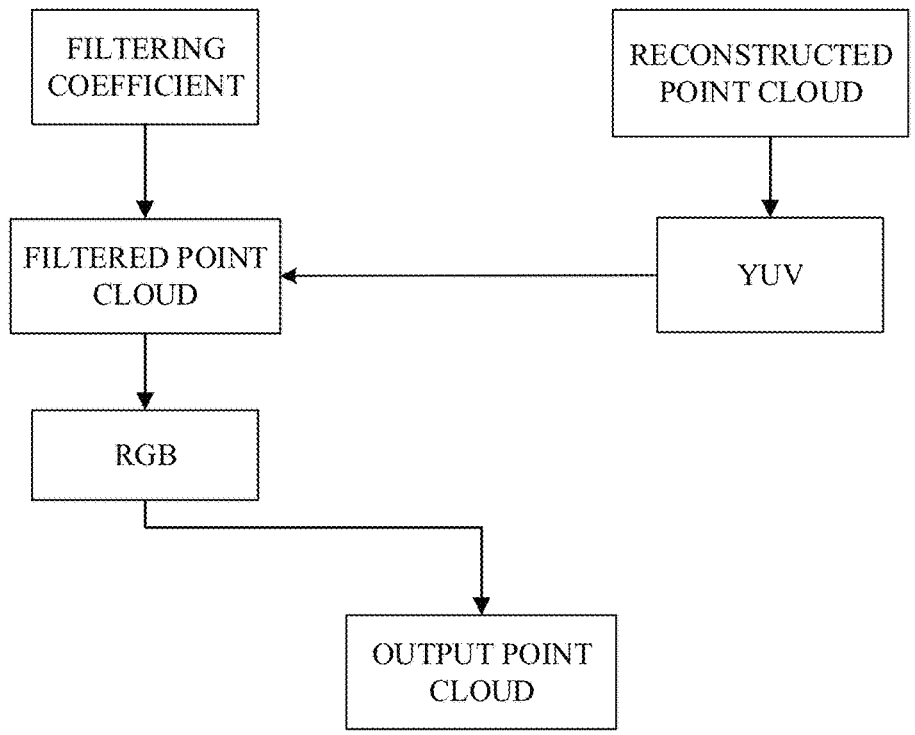
FIG. 10 is a schematic flow chart of filtering at a decoding end.
FIG. 11 is a schematic diagram of test results under a CY test condition.

FIG. 10 is a schematic flow chart of filtering at a decoding end. As illustrated in FIG. 10, when performing the Wiener filtering, the decoder can take the reconstructed point cloud and filtering coefficient as the input of Wiener filter at the decoding end. After completing the transform of the attribute information of the point in the reconstructed point cloud (such as transforming the colour information in the attribute information from the RGB space to the YUV space), the decoder can perform filtering with the filtering coefficient, obtain the filtered and quality-enhanced filtered point cloud through calculation, and output the filtered point cloud after completing the transform of the attribute information of the point in the filtered point cloud (from the YUV space to the RGB space).

It can be understood that in the disclosure, after the filtered point cloud is obtained, the previous reconstructed point cloud can be covered with the filtered point cloud, to achieve the whole encoding and decoding and quality enhancement operations.

Further, in embodiments of the disclosure, in the process of determining whether to filter the reconstructed point cloud, a determination factor of the quantization step size may be introduced. For example, in the case of the large quantization step size, only the Y component with large fluctuation can be filtered. In the case of the small quantization step, only UV components can be filtered.

It should be noted that in embodiments of the disclosure, two or more different filters (with different orders and/or shapes, etc.) can be set at the encoding end, for example, two filters with orders k1=16 and k2=128. The encoder can respectively filter the reconstructed point cloud with the two filters. Combining the final quality improvement, the running time, and the number of bits, a filter with better performance is selected, and then the information indicating the filter and the corresponding filtering parameter are signalled into the bitstream and transmitted to the decoding end. Accordingly, different corresponding filters are also arranged at the decoding end, and the decoder decodes the bitstream to obtain the information indicating the filter and the corresponding filtering parameter, so that a filter with better performance can be selected for filtering at the decoding end.

Furthermore, in embodiments of the disclosure, because the output of the colour attribute transform is integer, there will be information loss in the process. Therefore, at the decoding end, the point cloud sequence of YUV attribute can be directly output without transforming from YUV to RGB.

It should be noted that, in embodiments of the disclosure, FIG. 11 is a schematic diagram of test results under a CY test condition. FIG. 12 is a schematic diagram of test results under a C1 test condition. As illustrated in FIG. 11 and FIG. 12, after the point cloud encoding and decoding method provided in embodiments of the disclosure is implemented on the G-PCC reference software TMC13 V12.0, some test sequences (cat1-A & cat1-B) required by MPEG are tested under CTC CY and C1 test conditions. The CY condition is the encoding mode of lossless geometry and lossy attribute, and the C1 condition is the encoding mode of lossless geometry and nearly lossless attribute. End-to-end BD-AttrRate represents the BD-Rate of end-to-end attribute value, and the BD-Rate reflects the difference of psnr curves in two cases (with or without filtering). When the BD-Rate decreases, it means that the bitrate decreases and the performance improves in case of equal psnr. On the contrary, the performance decreases. That is, the more BD-Rate decreases, the better the compression effect. Cat1-A average and Cat1-B average respectively represent the average of the test results of point cloud sequences of the two data sets. Luma is Y component, chroma Cb is U component, chroma Cr is V component. Overall average is the average of the test results of all sequences.

Thus, the point cloud encoding and decoding method provided in embodiments of the disclosure includes the technology of performing Wiener filtering on the YUV components of the reconstructed value of the colour of the point cloud sequence. The quality enhancement can be selectively performed on the reconstructed point cloud output from the decoding end. Especially, for the sequence with dense distribution of points and the sequence with low bitrate, the optimization effect is outstanding. Moreover, less number of bits of the bitstream is increased, and the compression performance can be improved. Meanwhile, for the technology, all three colour attribute transform encoding modes (predicting transform, lifting transform, RAHT) are applicable, which has universality. Moreover, the technology will not affect the reconstruction process at the decoding end and will not cause other negative effects.

That is, aiming at the defects of common technologies, embodiments of the disclosure provide a technology for performing the Wiener filtering on the YUV components of the reconstructed value of the colour in encoding and decoding to achieve quality enhancement of the point cloud. One (or more) Wiener filters are respectively arranged at the encoding and decoding end, and the encoding end obtains the Wiener filtering coefficient through calculation and the decoding end reads the filtering coefficient, so that the reconstructed values of the point cloud can be post-processed, thereby achieving a better optimization effect.

The point cloud encoding and decoding method are disclosed in embodiments of the disclosure. At the encoding end, the filtering coefficient for filtering is calculated with the initial point cloud and the reconstructed point cloud, and after the reconstructed point cloud is determined to be filtered, the filtering coefficient is transmitted to the decoding end. Accordingly, the decoding end can directly decode to obtain the filtering coefficient, and use the filtering coefficient to filter the reconstructed point cloud, which can optimize the reconstructed point cloud, improve the quality of the point cloud, and greatly improve the encoding and decoding efficiency.

Based on the above embodiments, in another embodiment of the disclosure, FIG. 13 is a schematic structural diagram 1 of an encoder. As illustrated in FIG. 13, the encoder 300 provided in embodiments of the disclosure includes a first determining section 301, a constructing section 302, and an encoding section 303.

The first determining section 301 is configured to determine a reconstructed value of attribute information of a point in an initial point cloud. The constructing section 302 is configured to construct a reconstructed point cloud corresponding to the initial point cloud based on the reconstructed value. The first determining section 301 is further configured to: determine a filtering coefficient according to the initial point cloud and the reconstructed point cloud, obtain a filtered point cloud corresponding to the reconstructed point cloud with the filtering coefficient, and determine filtering flag information corresponding to the initial point cloud according to the reconstructed point cloud and the filtered point cloud, where the filtering flag information is used for determining whether to filter the reconstructed point cloud. The encoding section 303 is configured to signal the filtering flag information and the filtering coefficient into a bitstream when the filtering flag information indicates to filter the reconstructed point cloud.

FIG. 14 is a schematic structural diagram 2 of an encoder. As illustrated in FIG. 14, the encoder 300 according to embodiments of the disclosure may further include a first processor 304, a first memory 305 storing instructions executable by the first processor 304, a first communication interface 306, and a first bus 307 for connecting the first processor 304, the first memory 305 and, the first communication interface 306.

Further, in embodiments of the disclosure, the first processor 304 is configured to: determine a reconstructed value of attribute information of a point in an initial point cloud, construct a reconstructed point cloud corresponding to the initial point cloud based on the reconstructed value, determine a filtering coefficient according to the initial point cloud and the reconstructed point cloud, obtain a filtered point cloud corresponding to the reconstructed point cloud with the filtering coefficient, and determine filtering flag information corresponding to the initial point cloud according to the reconstructed point cloud and the filtered point cloud, where the filtering flag information is used for determining whether to filter the reconstructed point cloud, and signal the filtering flag information and the filtering coefficient into a bitstream when the filtering flag information indicates to filter the reconstructed point cloud.

Figure 15:
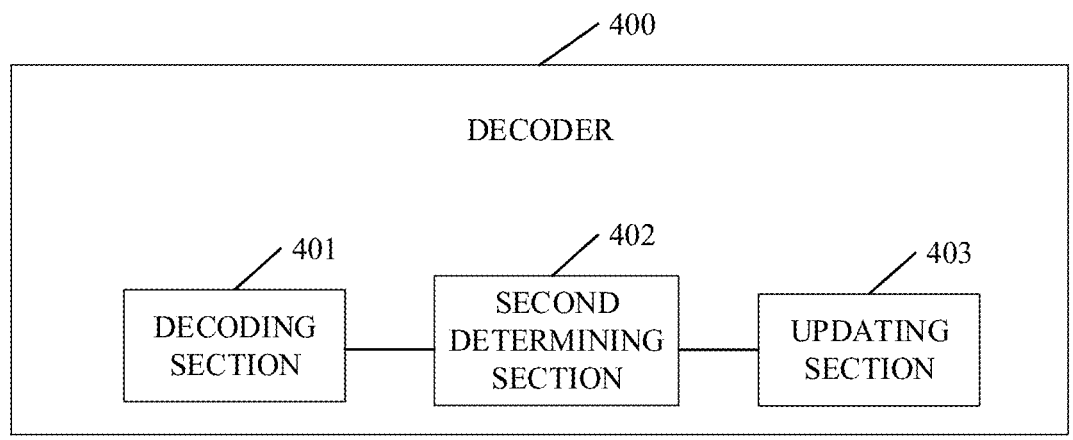
FIG. 15 is a schematic structural diagram 1 of a decoder.

FIG. 15 is a schematic structural diagram 1 of a decoder. As illustrated in FIG. 15, the decoder 400 provided in embodiments of the disclosure may include a decoding section 401, a second determining section 402, and an updating section 403.

The decoding section 401 is configured to decode a bitstream. The second determining section 402 is configured to: determine filtering flag information corresponding to an initial point cloud, where the filtering flag information is used for determining whether to filter a reconstructed point cloud corresponding to the initial point cloud, determine a filtering coefficient when the filtering flag information indicates to filter the reconstructed point cloud, and obtain a filtered point cloud corresponding to the reconstructed point cloud with the filtering coefficient. The updating section 403 is configured to update the reconstructed point cloud with the filtered point cloud.

Figure 16:
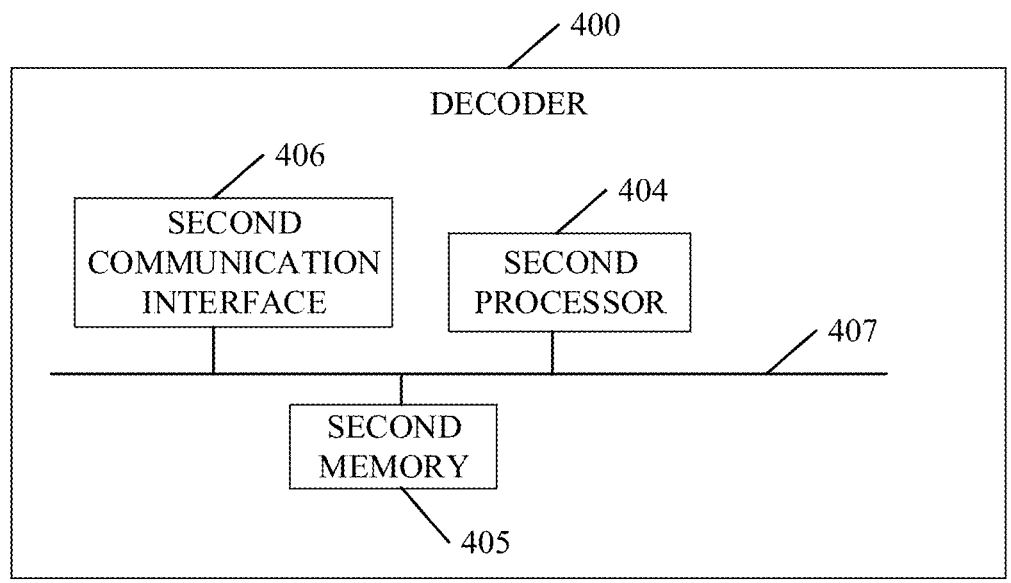
FIG. 16 is a schematic structural diagram 2 of a decoder.

FIG. 16 is a schematic structural diagram 2 of a decoder. As illustrated in FIG. 16, the decoder 400 provided in embodiments of the disclosure may further include a second processor 404, a second memory 405 storing instructions executable by the second processor 404, a second communication interface 406, and a second bus 407 for connecting the second processor 404, the second memory 405, and the second communication interface 406.

Further, in embodiments of the disclosure, the second processor 404 is configure to: decode a bitstream, determine filtering flag information corresponding to an initial point cloud, where the filtering flag information is used for determining whether to filter a reconstructed point cloud corresponding to the initial point cloud, determine a filtering coefficient when the filtering flag information indicates to filter the reconstructed point cloud, and obtain a filtered point cloud corresponding to the reconstructed point cloud with the filtering coefficient, and update the reconstructed point cloud with the filtered point cloud.

The integrated units, if implemented in the form of software functional modules and not sold or used as stand-alone products, may be stored in a computer-readable storage medium. Based on this understanding, the technical solution of this embodiment, in essence or in section contributing to the prior art, or in whole or in section of the technical solution, may be embodied in the form of a software product stored in a storage medium, including instructions for causing a computer device (which may be a personal computer, server, or network device, etc.) or processor to perform all or in section of the steps of the method of this embodiment. The aforementioned storage media includes a U disk, a removable hard disk, a read only memory (ROM), a random access memory (RAM), a magnetic disk or an optical disk, and other media capable of storing program codes.

The encoder and the decoder are provided in embodiments of the disclosure. The decoder decodes the bitstream to determine the filtering flag information corresponding to the initial point cloud, where the filtering flag information is used for determining whether to filter the reconstructed point cloud corresponding to the initial point cloud, determines the filtering coefficient when the filtering flag information indicates to filter the reconstructed point cloud, obtains the filtered point cloud corresponding to the reconstructed point cloud with the filtering coefficient, and updates the reconstructed point cloud with the filtered point cloud. The encoder determines the reconstructed value of the attribute information of the point in the initial point cloud, and constructs the reconstructed point cloud corresponding to the initial point cloud based on the reconstructed value, determines the filtering coefficient according to the initial point cloud and the reconstructed point cloud, obtains the filtered point cloud corresponding to the reconstructed point cloud with the filtering coefficient, determines the filtering flag information corresponding to the initial point cloud according to the reconstructed point cloud and the filtered point cloud, where the filtering flag information is used for determining whether to filter the reconstructed point cloud, and signals the filtering flag information and the filtering coefficient into the bitstream when the filtering flag information indicates to filter the reconstructed point cloud. That is, for the point cloud encoding and decoding method provided in the disclosure, at the encoding end, the filtering coefficient for filtering is calculated with the initial point cloud and the reconstructed point cloud, and after the reconstructed point cloud is determined to be filtered, the filtering coefficient is transmitted to the decoding end. Accordingly, the decoding end can directly decode to obtain the filtering coefficient, and use the filtering coefficient to filter the reconstructed point cloud, which can optimize the reconstructed point cloud, improve the quality of the point cloud, and greatly improve the encoding and decoding efficiency.

Embodiments of the disclosure provide a computer-readable storage medium. The computer-readable storage medium has a program stored thereon. When executed by a processor, the program implements the method described in the above embodiments.

The program instructions corresponding to the point cloud encoding method in embodiments can be stored on a storage medium such as an optical disk, a hard disk, a U disk, etc. When the program instructions corresponding to the point cloud encoding method in the storage medium is read or executed by an electronic device, the program instructions include the following.

A reconstructed value of attribute information of a point in an initial point cloud is determined, and a reconstructed point cloud corresponding to the initial point cloud is constructed based on the reconstructed value. A filtering coefficient is determined according to the initial point cloud and the reconstructed point cloud. A filtered point cloud corresponding to the reconstructed point cloud is obtained with the filtering coefficient. Filtering flag information corresponding to the initial point cloud is determined according to the reconstructed point cloud and the filtered point cloud, where the filtering flag information is used for determining whether to filter the reconstructed point cloud. The filtering flag information and the filtering coefficient are signalled into a bitstream when the filtering flag information indicates to filter the reconstructed point cloud.

The program instructions corresponding to the point cloud decoding method in embodiments can be stored on a storage medium such as an optical disk, a hard disk, a U disk, etc. When the program instructions corresponding to the point cloud decoding method in the storage medium is read or executed by an electronic device, the program instructions include the following.

A bitstream is decoded to determine filtering flag information corresponding to an initial point cloud, where the filtering flag information is used for determining whether to filter a reconstructed point cloud corresponding to the initial point cloud. A filtering coefficient is determined when the filtering flag information indicates to filter the reconstructed point cloud. A filtered point cloud corresponding to the reconstructed point cloud is obtained with the filtering coefficient. The reconstructed point cloud is updated with the filtered point cloud.

Those skilled in the art will appreciate that embodiments of the disclosure may be provided as methods systems or computer program products. Accordingly, in the disclosure, the form of a hardware embodiment a software embodiment or an embodiment combining software and hardware may be taken. Further, in the disclosure the form of a computer program product implemented on one or more computer-usable storage media (including, but not limited to, disk storage, optical storage, etc.) containing computer-usable program code therein may be taken.

The disclosure is described with reference to implementation flow diagrams and/or block diagrams of methods, devices (systems), and computer program products according to embodiments of the disclosure. It should be understood that each of the flow diagrams and/or blocks in the flow diagrams and/or block diagrams, as well as combinations of the flow diagrams and/or blocks in the flow diagrams and/or block diagrams, may be implemented by computer program instructions. The computer program instructions may be provided to a processor of a general-purpose computer, a special purpose computer, an embedded processor, or other programmable data processing device to generate a machine such that instructions executed by the processor of the computer or other programmable data processing device generate means for implementing the functions specified in one or more flows in the schematic flow chart and/or one or more blocks in the block diagram.

The computer program instructions may also be stored in a computer-readable memory capable of directing a computer or other programmable data processing device to operate in a specific manner such that the instructions stored in the computer-readable memory produce an article of manufacture including instruction means that perform the functions specified in one or more flows in the schematic flow chart and/or one or more blocks in the block diagram.

The computer program instructions may also be loaded onto a computer or other programmable data processing device such that a series of operational steps are executed on the computer or other programmable device to produce computer-implemented processing, such that the instructions executed on the computer or other programmable device provide steps for implementing the functions specified in one or more flows in the schematic flow chart and/or one or more blocks in the block diagram.

The above is merely some embodiments of the disclosure and is not intended to limit the scope of protection of the disclosure.

INDUSTRIAL APPLICABILITY

The point cloud encoding and decoding method, the encoder, the decoder, and the computer storage medium are provided in embodiments of the disclosure. The decoder decodes the bitstream to determine the filtering flag information corresponding to the initial point cloud, where the filtering flag information is used for determining whether to filter the reconstructed point cloud corresponding to the initial point cloud, determines the filtering coefficient when the filtering flag information indicates to filter the reconstructed point cloud, obtains the filtered point cloud corresponding to the reconstructed point cloud with the filtering coefficient, and updates the reconstructed point cloud with the filtered point cloud. The encoder determines the reconstructed value of the attribute information of the point in the initial point cloud, and constructs the reconstructed point cloud corresponding to the initial point cloud based on the reconstructed value, determines the filtering coefficient according to the initial point cloud and the reconstructed point cloud, obtains the filtered point cloud corresponding to the reconstructed point cloud with the filtering coefficient, determines the filtering flag information corresponding to the initial point cloud according to the reconstructed point cloud and the filtered point cloud, where the filtering flag information is used for determining whether to filter the reconstructed point cloud, and signals the filtering flag information and the filtering coefficient into the bitstream when the filtering flag information indicates to filter the reconstructed point cloud. That is, for the point cloud encoding and decoding method provided in the disclosure, at the encoding end, the filtering coefficient for filtering is calculated with the initial point cloud and the reconstructed point cloud, and after the reconstructed point cloud is determined to be filtered, the filtering coefficient is transmitted to the decoding end. Accordingly, the decoding end can directly decode to obtain the filtering coefficient, and use the filtering coefficient to filter the reconstructed point cloud, which can optimize the reconstructed point cloud, improve the quality of the point cloud, and greatly improve the encoding and decoding efficiency.

What is claimed is:

1. A point cloud decoding method, applied to a decoder and comprising:
   decoding a bitstream to determine filtering flag information corresponding to an initial point cloud, the filtering flag information being used for determining whether to filter a reconstructed point cloud corresponding to the initial point cloud;
   determining a filtering coefficient when the filtering flag information indicates to filter the reconstructed point cloud;
   obtaining a filtered point cloud corresponding to the reconstructed point cloud with the filtering coefficient; and
   updating the reconstructed point cloud with the filtered point cloud.

2. The method of claim 1, wherein before obtaining the filtered point cloud corresponding to the reconstructed point cloud with the filtering coefficient, the method further comprises:
   decoding the bitstream to determine a filtering index parameter corresponding to the initial point cloud; and
   determining the filtering coefficient when the filtering index parameter indicates to filter the reconstructed point cloud.

3. The method of claim 2, wherein:
   determining not to filter the reconstructed point cloud when the filtering index parameter has a value of 0; and
   determining to filter the reconstructed point cloud when the filtering index parameter does not have the value of 0.

4. The method of claim 3, wherein:
   determining to filter the reconstructed point cloud with a one-dimensional filter when the filtering index parameter has the value of 1; and
   determining to filter the reconstructed point cloud with a two-dimensional filter when the filtering index parameter has the value of 2, wherein the two-dimensional filter is any of a diamond filter and a rectangular filter.

5. The method of claim 2, wherein:
   skipping determining the filtering coefficient when the filtering flag information indicates not to filter the reconstructed point cloud; or
   skipping determining the filtering coefficient when a value of the filtering index parameter indicates not to filter the reconstructed point cloud.

6. The method of claim 2, further comprising:
   determining a quantization parameter of the initial point cloud; and
   determining whether to filter the reconstructed point cloud according to at least one of the quantization parameter, the filtering flag information, or the filtering index parameter.

7. The method of claim 1, further comprising:
   determining a reconstructed value of attribute information of a point in the initial point cloud, and constructing the reconstructed point cloud corresponding to the initial point cloud based on the reconstructed value, wherein:

a colour component comprises an R component, a G component, and a B component when the attribute information is colour information in an RGB space;
the colour component comprises a Y component, a U component, and a V component when the attribute information is colour information in a YUV space; and
the colour component comprises a Y component, a Cb component, and a Cr component when the attribute information is colour information in a YCbCr space.

8. The method of claim 7, wherein the filtering coefficient comprises a filtering coefficient vector corresponding to the colour component, and wherein obtaining the filtered point cloud corresponding to the reconstructed point cloud with the filtering coefficient comprises:
determining, according to a reconstructed component value of the colour component of colour information of a point in the reconstructed point cloud and a filter type, a second attribute parameter corresponding to the colour component;
determining a filtered value of attribute information corresponding to the colour component according to the filtering coefficient vector corresponding to the colour component and the second attribute parameter; and
constructing the filtered point cloud based on the filtered value.

9. The method of claim 8, further comprising:
decoding the bitstream to determine information indicating an optimal filter type and a filtering coefficient corresponding to the optimal filter type, wherein the optimal filter type is one of at least one filter type, and the filter type is used for indicating at least one of a filter order, a filter shape, or a filter dimension.

10. The method of claim 1, wherein:
the filtering flag information comprises identification information of a colour component;
indicate not to filter the colour component when the identification information of the colour component has a value of a first value;
indicate to filter the colour component when the identification information of the colour component has the value of a second value; and
the first value is equal to 0 and the second value is equal to 1; or
the first value is set to "false" and the second value is set to "true".

11. The method of claim 10, further comprising:
determining that the filtering flag information indicates not to filter the reconstructed point cloud when all identification information of colour components is the first value; and
determining that the filtering flag information indicates to filter the reconstructed point cloud when not all identification information of colour components is the first value.

12. A point cloud encoding method, applied to an encoder and comprising:
determining a reconstructed value of attribute information of a point in an initial point cloud, and constructing a reconstructed point cloud corresponding to the initial point cloud based on the reconstructed value;
determining a filtering coefficient according to the initial point cloud and the reconstructed point cloud;
obtaining a filtered point cloud corresponding to the reconstructed point cloud with the filtering coefficient;
determining filtering flag information corresponding to the initial point cloud according to the reconstructed point cloud and the filtered point cloud, the filtering flag information being used for determining whether to filter the reconstructed point cloud; and
signalling the filtering flag information and the filtering coefficient into a bitstream when the filtering flag information indicates to filter the reconstructed point cloud.

13. The method of claim 12, further comprising:
determining a filtering index parameter corresponding to the initial point cloud according to the reconstructed point cloud and the filtered point cloud; and
signalling the filtering index parameter and the filtering coefficient into the bitstream when a value of the filtering index parameter indicates to filter the reconstructed point cloud.

14. The method of claim 13, further comprising:
determining a quantization parameter of the initial point cloud; and
determining whether to filter the reconstructed point cloud according to at least one of the quantization parameter, the filtering flag information, or the filtering index parameter.

15. The method of claim 12, wherein:
a colour component comprises an R component, a G component, and a B component when the attribute information is colour information in an RGB space;
the colour component comprises a Y component, a U component, and a V component when the attribute information is colour information in a YUV space; and
the colour component comprises a Y component, a Cb component, and a Cr component when the attribute information is colour information in a YCbCr space; and
determining the filtering coefficient according to the initial point cloud and the reconstructed point cloud comprises:
determining, according to an initial component value of the colour component of colour information of the point in the initial point cloud, a first attribute parameter of the colour component;
determining, according to a reconstructed component value of the colour component of colour information of a point in the reconstructed point cloud and a filter type, a second attribute parameter of the colour component; and
determining the filtering coefficient based on the first attribute parameter and the second attribute parameter.

16. The method of claim 15, wherein determining the filtering coefficient based on the first attribute parameter and the second attribute parameter comprises:
determining a cross-correlation parameter according to the first attribute parameter and the second attribute parameter;
determining an auto-correlation parameter according to the second attribute parameter;
determining a filtering coefficient vector corresponding to the colour component based on the cross-correlation parameter and the auto-correlation parameter; and
determining the filtering coefficient with the filtering coefficient vector corresponding to the colour component.

17. The method of claim 15, wherein determining the filtering flag information corresponding to the initial point cloud according to the reconstructed point cloud and the filtered point cloud comprises:
determining a first performance parameter of the colour component of a point in the reconstructed point cloud and a second performance parameter of the colour component of a point in the filtered point cloud;

determining identification information of the colour component according to the first performance parameter and the second performance parameter; and determining the filtering flag information according to the identification information of the colour component.

18. The method of claim 15, further comprising:

constructing at least one second attribute parameter corresponding to the colour component according to the reconstructed component value of the colour component of the colour information of the point in the reconstructed point cloud and at least one filter type, to determine at least one group of filtering coefficients corresponding to the at least one filter type, wherein one filter type corresponds to one group of filtering coefficients;

filtering the reconstructed point cloud with the at least one group of filtering coefficients based on the at least one filter type, to obtain at least one filtered point cloud corresponding to the at least one filter type, wherein one filter type corresponds to one filtered point cloud;

selecting an optimal filter type from the at least one filter type based on the at least one filtered point cloud; and signalling information indicating the optimal filter type and a filtering coefficient corresponding to the optimal filter type into the bitstream, wherein the filter type is used for indicating at least one of a filter order, a filter shape, or a filter dimension.

19. The method of claim 13, further comprising:

skipping signalling the filtering coefficient into the bitstream when the filtering flag information indicates not to filter the reconstructed point cloud; or skipping signalling the filtering coefficient into the bitstream when the value of the filtering index parameter indicates not to filter the reconstructed point cloud.

20. A decoder, comprising:

at least one processor; and a memory coupled to the at least one processor and storing at least one computer executable instruction thereon which, when executed by the at least one processor, causes the at least one processor to:

decode a bitstream;

determine filtering flag information corresponding to an initial point cloud, the filtering flag information being used for determining whether to filter a reconstructed point cloud corresponding to the initial point cloud, determine a filtering coefficient when the filtering flag information indicates to filter the reconstructed point cloud, and obtain a filtered point cloud corresponding to the reconstructed point cloud with the filtering coefficient; and update the reconstructed point cloud with the filtered point cloud.

* * * * *